US012780565B2

(12) United States Patent
Chatani et al.

(10) Patent No.: US 12,780,565 B2
(45) Date of Patent: Nov. 3, 2026

(54) PICKING SYSTEM, PICKING DEVICE, CONTROL DEVICE, STORAGE MEDIUM, AND METHOD

(71) Applicant: Kabushiki Kaisha Toshiba, Tokyo (JP)

(72) Inventors: Harutoshi Chatani, Yokohama (JP); Kazunobu Konda, Suginami (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 244 days.

(21) Appl. No.: 18/047,807

(22) Filed: Oct. 19, 2022

(65) Prior Publication Data

US 2023/0126805 A1 Apr. 27, 2023

(30) Foreign Application Priority Data

Oct. 22, 2021 (JP) ................................ 2021-173409

(51) Int. Cl.
*B65G 47/90* (2006.01)
*B25J 9/16* (2006.01)

(52) U.S. Cl.
CPC .......... *B65G 47/905* (2013.01); *B25J 9/1664* (2013.01); *B25J 9/1697* (2013.01)

(58) Field of Classification Search
CPC ...... B25J 9/1664; B25J 9/1697; B25J 9/1674; B25J 9/163; B25J 13/08; B25J 15/00;
(Continued)

(56) References Cited

U.S. PATENT DOCUMENTS 10,335,947 B1 7/2019 Diankov et al.
10,549,928 B1 2/2020 Chavez et al.
(Continued)

FOREIGN PATENT DOCUMENTS

CN 109816728 A 5/2019
JP 2010-69542 A 4/2010
(Continued)

OTHER PUBLICATIONS

Hernandez et al., "Team Delft 's Robot Winner of the Amazon Picking Challenge 2016", Springer International Publishing AG, 2017, pp. 613-624 XP047473340.
(Continued)

*Primary Examiner* — Abby Lin
*Assistant Examiner* — Kayla R Doros
(74) *Attorney, Agent, or Firm* — Oblon, McClelland, Maier & Neustadt, L.L.P.

(57) ABSTRACT

According to an embodiment, a picking system having a holder, a controller, and a sensor is provided. The holder holds the object. The controller controls a motion of the holder. The sensor acquires information of the object. A failure detector of the controller detects a failure in a generation of the holding operation plan or a failure in a holding operation on the object by the holder. A determiner of the controller performs a first retry determination of deciding an operation for a retry in a case in which the failure detector detects the failure in the generation of the holding operation plan, and performing a second retry determination of deciding an operation for a retry in a case in which the failure detector detects the failure in a pickup of the object by the holder, the second retry determination being different from the first retry determination.

20 Claims, 12 Drawing Sheets

(58) Field of Classification Search
CPC ........ B25J 13/00; B25J 13/089; B25J 9/1612; B25J 19/023; G05B 2219/40014; G05B 2219/40053; G05B 2219/45063; G05B 2219/40563; G05B 2219/40583; G05B 2219/40006; G05B 2219/37555; G05B 19/19; B65G 47/905; B65G 61/00; B65G 47/917; G06T 2207/10028; G06T 7/70; G06T 1/0014; G06V 20/64
See application file for complete search history.

(56) References Cited

U.S. PATENT DOCUMENTS

| | | | | |
|---|---|---|---|---|
| 2015/0127162 | A1* | 5/2015 | Gotou | B25J 9/1612 700/259 |
| 2015/0276383 | A1* | 10/2015 | Yoshikawa | G01S 17/89 348/136 |
| 2017/0252924 | A1* | 9/2017 | Vijayanarasimhan | B25J 9/1612 |
| 2018/0229379 | A1* | 8/2018 | Naito | B25J 9/1676 |
| 2018/0276501 | A1* | 9/2018 | Yamada | G06V 10/454 |
| 2019/0283249 | A1* | 9/2019 | Komoda | B25J 9/1669 |
| 2019/0329409 | A1* | 10/2019 | Yamada | B25J 9/1661 |
| 2020/0270071 | A1* | 8/2020 | Chavez | B25J 9/1697 |
| 2020/0331144 | A1* | 10/2020 | Huang | B25J 9/1664 |
| 2021/0170588 | A1 | 6/2021 | Chatani | |
| 2021/0233258 | A1* | 7/2021 | Sieb | G06F 18/22 |

FOREIGN PATENT DOCUMENTS

| | | | |
|---|---|---|---|
| JP | 5196156 | B2 | 5/2013 |
| JP | 2017136649 | A * | 8/2017 |
| JP | 2019-188516 | A | 10/2019 |
| JP | 2020-124800 | A | 8/2020 |
| JP | 2021-91036 | A | 6/2021 |
| WO | WO 2021/155037 | A1 | 8/2021 |

OTHER PUBLICATIONS

Combined Chinese Office Action and Search Report issued Nov. 13, 2025 in Chinese Patent Application No. 202211227366.3 (with unedited computer-generated English Translation), 28 pages.

* cited by examiner

FIG. 3

366

| POSITION AND POSTURE INFORMATION NO. | POSITION AND POSTURE INFORMATION | STATE | SCORE |
|---|---|---|---|
| 1 | ··· | FAILURE | 0.8 |
| 2 | ··· | FAILURE | 0.7 |
| 3 | ··· | UNDETERMINED | 0.3 |
| 4 | ··· | UNDETERMINED | 0.2 |

PICKING SYSTEM, PICKING DEVICE, CONTROL DEVICE, STORAGE MEDIUM, AND METHOD

CROSS-REFERENCE TO RELATED APPLICATION(S)

This application is based upon and claims the benefit of priority from Japanese Patent Application No. 2021-173409, filed Oct. 22, 2021; the entire contents of which are incorporated herein by reference.

FIELD

An embodiment of the invention is related to a picking system, a picking device, a control device, a non-transitory computer readable storage medium to storing a program, and a method.

BACKGROUND

In a logistics site or the like, a picking operation is performed, in which one or more objects are picked up from a storage location and transported to another region, in accordance with a designated order of the objects. A picking device performing the picking operation is known.

BRIEF DESCRIPTION OF THE DRAWINGS

FIG. 3 is a figure showing a position and posture table in the picking system according to the embodiment.

DETAILED DESCRIPTION

A picking system according to an embodiment is a picking system for picking an object disposed in a first region. The picking system has a holder, a controller, and a sensor. The holder holds the object. The controller controls a motion of the holder. The sensor acquires information of the object. The controller has an acquirer, a planner, a motion controller, a failure detector, and a determiner. The acquirer acquires information from the sensor. The planner generates a holding operation plan of holding the object by the holder, based on information. The motion controller controls a motion of the holder such that the holder performs a pickup operation and a transport operation on the object, based on holding operation plan. The failure detector detects a failure in a generation of the holding operation plan or a failure in a holding operation on the object by the holder. The determiner performs a first retry determination of deciding an operation for a retry in a case in which the failure detector detects the failure in the generation of the holding operation plan. The determiner performs a second retry determination of deciding an operation for a retry in a case in which the failure detector detects the failure in a pickup of the object by the holder, the second retry determination being different from the first retry determination.

Hereafter, a picking system, a picking device, a control device, a storage medium, and a method according to an embodiment is described with reference to the drawings.

Figure 1:
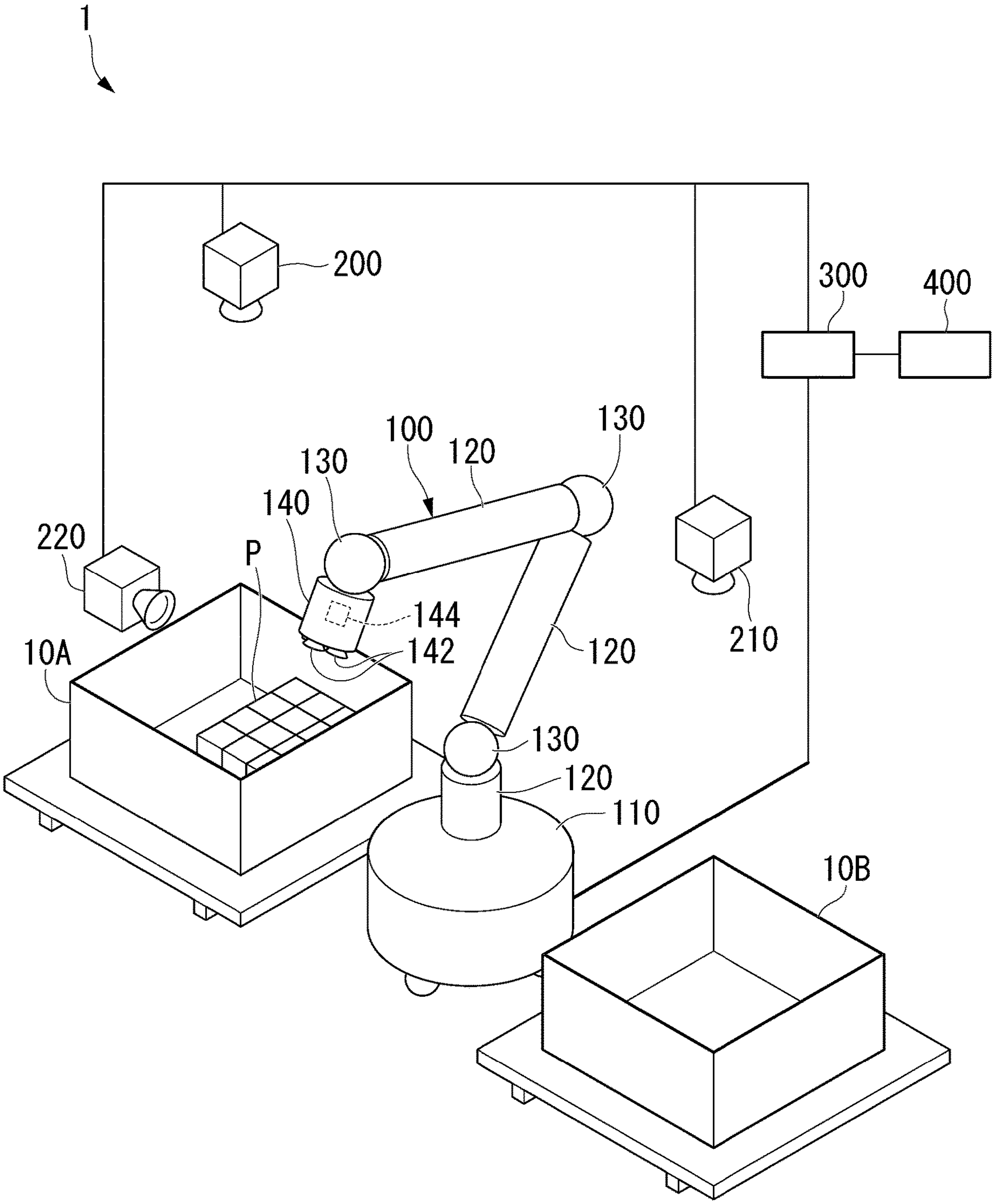
FIG. 1 is a schematic figure showing the picking system according to the embodiment.
Figure 2:
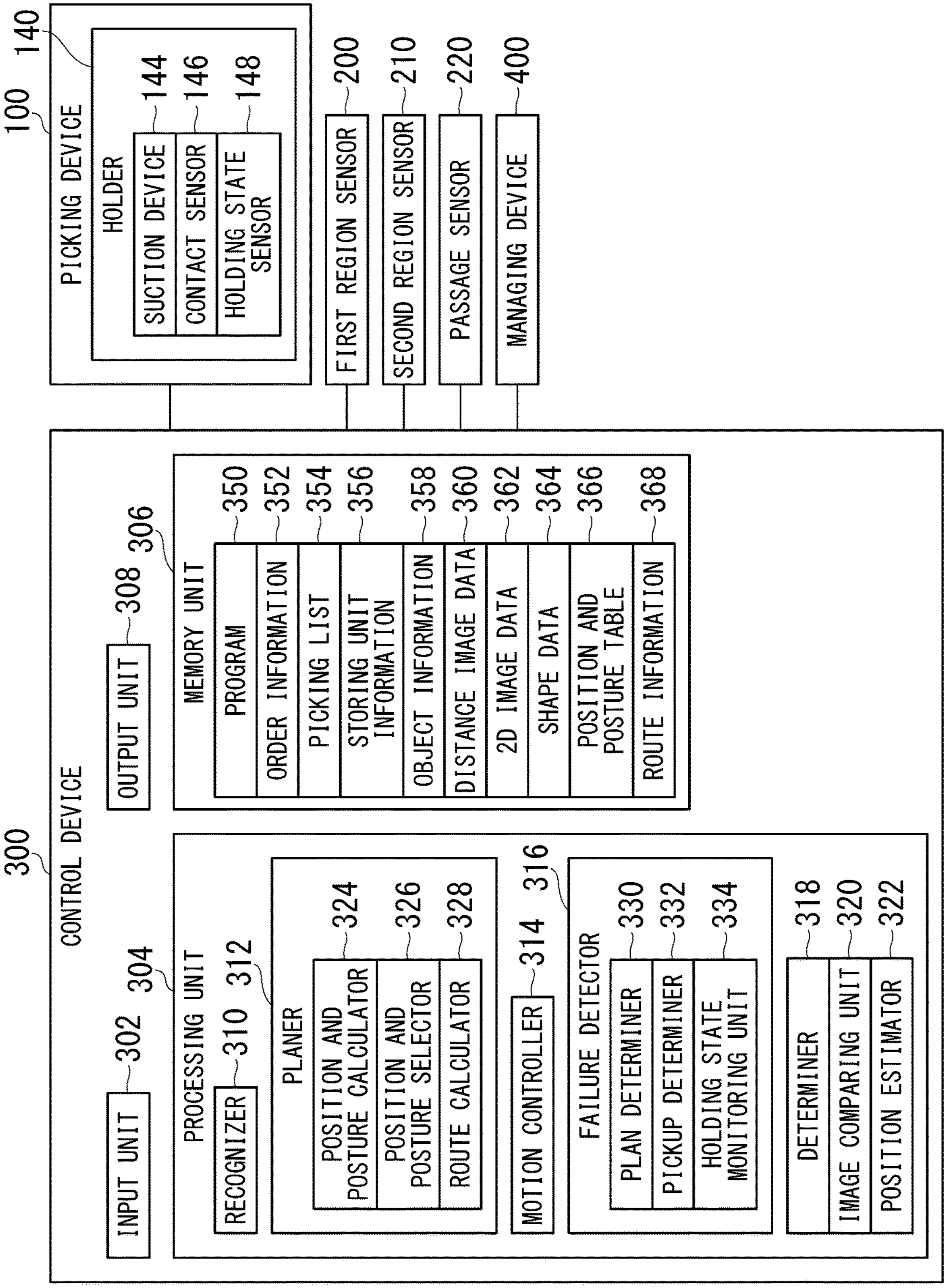
FIG. 2 is a block diagram showing a system constitution of the picking system according to the embodiment.

First, the constitution of the picking system 1 is described with reference to FIGS. 1 and 2. FIG. 1 is a schematic figure showing a picking system 1 according to the embodiment. FIG. 2 is a block diagram showing a system constitution of a picking system 1 according to the embodiment.

The picking system 1 performs a picking operation of picking up one or more objects P from a first container 10A (an example of a "first region"), which stores the objects P, and transporting them to a second container 10B (an example of a "second region"), in accordance with a given order, for example in a logistics site such as a repository. As used herein, "picking" means an operation including a pickup operation of raising up the target object P in a holding manner, and a transport operation of transporting the raised object P to a destination in a holding manner. The "order" includes a list of the objects P to be picked up.

It should be noted that the picking system 1 is not limited to a logistics system, but is widely applicable to an industrial robot system or other systems. As used herein, the "picking system" and the "picking device" are not limited to systems or devices whose main purpose is to transport an object(s), but include systems or devices which transport (move) an object(s) as a part of product assembly or for another purpose.

As shown in FIGS. 1 and 2, the picking system 1 has a picking device 100, a first region sensor 200, a second region sensor 210, a passage sensor 220, a control device 300 (an example of a "controller"), and a managing device 400. The picking system 1 moves the object P stored in a first container 10A (a travel source) to a second container 10B (a travel destination). The first container 10A and the second container 10B are any containers which can store the object P, not limited to a specific constitution.

The picking device 100 performs a picking operation on the object P. The picking device 100 is not limited to a specific constitution, but may be a robot device as shown in FIG. 1, or a flight body such as a drone which raises up and moves a holder using a rotary wing. The picking device 100 can communicate with the control device 300 by wire or wirelessly. As shown in FIG. 1, the picking device 100 has a base body 110, arms 120, joints 130, and a holder 140.

The base body 110 is a main body of the picking device 100. The base body 100 may be movable as shown in FIG.

1, or secured to a floor surface. The arms 120 are movable arms, whose one end part extends from the upper surface of the base body 110, and whose other end part is provided with the holder 140. The arms 120 has a structure in which a plurality of arm members are coupled with each other via the joints 130. The arms can be in various positions and postures for holding the object P, similarly to human's arms or hands. For example, the arms 120 are six-axis vertical articulated robot arms.

The holder 140 is a holding mechanism (an end effector) which holds the object P stored in the first container 10A. In the example shown in FIG. 1, the holder 140 is an adsorption-type holding mechanism. The holder 140 has an adsorber 142, a suction device 144, a contact sensor 146, and a holding state sensor 148.

The adsorber 142 is provided on an end of the holder 140. The adsorber 142 is configured to adsorb on the surface of the object P. For example, one or more adsorbers 142 may be provided. Preferably, the adsorption area of the adsorber 142 is smaller than the smallest object P that is stored in the first container 10A. The adsorber 142 is in communication with the suction device 144 provided inside the holder 140.

The suction device 144 is, for example, a vacuum pump. The holder 140 can bring the adsorber 142 into contact with the surface of the holding target the object P and drive the suction device 144, thereby lowering the pressure within the holder 140 below the ambient pressure to hold the object P by the adsorber 142 in an adsorbing manner.

The contact sensor 146 is a sensor which detects that the holder 140 physically contacts a target. The contact sensor 146 is, for example, attached to the adsorber 142. Any sensor which can detect the contact with an object is available as the contact sensor 146.

The holding state sensor 148 is a sensor which detects a change in the holding state in a case in which the holder 140 is holding the object P. For example, the holding state sensor 148 is a pressure sensor which detects a change in a suction power of the suction device by detecting the pressure in the internal space of the holder 140 coupling the adsorber 142 and the suction device 144. For example, in a case in which the pressure within the holder 140 drastically decreases, the holding state sensor 148 can determine that the object P which was adsorbed by the adsorber 142 has left, and that the holder 140 has changed from a state of holding the object P to a state of not holding the object P. Moreover, for example, in a case in which the pressure within the holder 140 drastically increases, the holding state sensor 148 can determine that, the adsorber 142 has adsorbed the object P and that the holder 140 has changed from a state of not holding the object P to a state of holding the object P.

It should be noted that the constitution of the holder 140 is not limited to the above example. For example, the holder 140 may be a pinching hand which pinches the object P using two or more fingers. Alternatively, the holder 140 may be a hybrid-type hand having an adsorption mechanism and a pinching mechanism both. For example, the holder 140 may be configured to have an adsorption mechanism provided on an end of a finger(s) of the pinching hand, or configured to have an adsorber on one end of the holder 140 and a pinching portion on the other end. Alternatively, the holder 140 may be configured to hold the object P using another mechanism such as a magnetic force or a jamming phenomenon. In addition, the picking device 100 may have two or more holders 140. In such a case, each holder 140 may have the same holding mechanism as each other, or have holding mechanisms which are different from each other in a holding principle, structure, shape, dimension, or arrangement.

The first region sensor 200 (an example of a "sensor") acquires information of the first container 10A and the object(s) P within the first container 10A. For example, the first region sensor 200 is an image sensor which acquires an image of the first container 10A. In the example shown in FIG. 1, the first region sensor 200 is a camera provided above the first container 10A, imaging the first container 10A from above. The first region sensor 200 can, for example, acquire two-dimensional (2D) image data, distance image data, shape data, etc. The "two-dimensional (2D) image data" refers to image data which can be represented on a plane, as imaged by a usual camera. The "distance image data" refers to image data having distance information in one or more directions (e.g., information of depth from any reference plane above the first container 10A). The "shape data" refers to data showing an outline shape of a target such as the object P. Information of the three-dimensional shapes of the first container 10A and the object P stored in the first container 10A can be acquired from the distance image data including distance information in depth direction. It should be noted that the shape data may be, for example, generated by a recognizer 310 described below, based on the distance image data. The first region sensor 200 is connected to the control device 300 by wire or wirelessly. The information detected by the first region sensor 200 is output to the control device 300.

The second region sensor 210 (an example of a "sensor") acquires information of the second container 10B and the object(s) P within the second container 10B. For example, the second region sensor 210 is an image sensor which acquires an image of the second container 10B. In the example shown in FIG. 1, the second region sensor 210 is a camera above the second container 10B, imaging the second container 10B from above. The second region sensor 210 can, for example, acquire 2D image data, distance image data, shape data, etc. The second region sensor 210 is connected to the control device 300 by wire or wirelessly. The information detected by the second region sensor 210 is output to the control device 300.

The passage sensor 220 is provided above the first container 10A, and detects that the object passes above the first container 10A. For example, the passage sensor 220 is a light sensor including a light emitter which irradiates light, and a light receiver which detects light. In such a case, the light emitter of the passage sensor 220 constantly irradiates light such as infrared light or visible light toward the light receiver such that the light passes above the first container 10A. The passage sensor 220 detects that an object has passed above the first container 10A, by detecting a break of the light from the light emitter in the light receiver. Thereby, the passage sensor 220 can, for example, detect that the holder 140 has entered the first container 10A from above, that the holder 140 has escaped from the first container 10A to above, that the object P has dropped onto the first container 10A from above, etc. The passage sensor 220 is connected to the control device 300 by wire or wirelessly. The information detected by the passage sensor 220 is output to the control device 300. It should be noted that the passage sensor 220 is not limited to the above example, but may have any constitution such as a usual camera or a magnetic sensor. In addition, not only detecting the passage of the object, the passage sensor 220 may acquire information including a shape of the object which has passed (e.g., as image data or shape data).

It should be noted that the first region sensor 200, the second region sensor 210, and the passage sensor 220 do not necessarily have to be provided as separate sensors. A certain single sensor may perform functions of two or more sensors among the first region sensor 200, the second region sensor 210, and the passage sensor 220. In addition, one or more of the first region sensor 200, the second region sensor 210, and the passage sensor 220 may be provided as a part of the picking device 100.

The control device 300 controls the entire picking system 1. The control device 300 acquires the information detected by the first region sensor 200, the second region sensor 210, and the passage sensor 220, and controls the picking device 100 based on the acquired information. The control device 300 is, for example, a program-executable information processing device (computer) having a processor, a memory, a storage, etc. The control device 300 may be incorporated into any device such as the picking device 100.

As shown in FIG. 2, the control device 300 includes an input unit 302, a processing unit 304, a memory unit 306, and an output unit 308.

The input unit 302 (an example of "acquirer") is provided with an input/output interface, and receives an input to the control device 300. For example, the input unit 302 receives order information about the holding target object P from an operator or a system. Moreover, the input unit 302 receives information acquired by various sensors such as the first region sensor 200, the second region sensor 210, or the passage sensor 220.

The processing unit 304 performs a certain arithmetic processing on the input received by the input unit 302. The processing unit 304 includes a recognizer 310, a planner 312, a motion controller 314, a failure detector 316, a determiner 318, an image comparing unit 320, and a position estimator 322.

The recognizer 310 processes the information acquired by the first region sensor 200 and the second region sensor 210. For example, the recognizer 310 determines the position, the shape, etc. of the first container 10A and determines the position, the posture, the shape, the properties, etc. of the object(s) P within the first container 10A, based on the distance image data 360 and/or the 2D image data 362 acquired by the first region sensor 200. The recognizer 310 also determines the position, the shape, etc. of the second container 10B and determines the position, the posture, the shape, the properties, etc. of the object(s) P within the second container 10B, based on the distance image data 360 and/or the 2D image data 362 acquired by the second region sensor 210. For example, the recognizer 310 can generate shape data 364 of the first container 10A, the second container 10B, and each object P from the distance image data 360 and/or the 2D image data 362. The recognizer 310 can also recognize, for each object P, a region which can be held by the holder 140 (the holding area) based on the distance image data 360 and/or the shape data 364. For example, for the object P having two plane areas which can be adsorbed by the adsorber 142, the recognizer 310 recognizes the two plane areas as different holding areas.

The planner 312 generates a holding operation plan in which the holder 140 of the picking device 100 performs a picking process of the object P, based on the recognition result of the recognizer 310, etc. The holding operation plan is a plan of a holding operation of the object P by the holder 140. The holding operation includes a pickup operation and a transport operation. For example, the holding operation plan includes information of a traveling route to the position at which the holder 140 picks up the object P within the first container 10A, information of the position and posture of the holder 140 in picking up the object P, information of a route for transporting the object P to the second container 10B after picking up the object P, etc. The planner 312 includes a position and posture calculator 324, a position and posture selector 326, and a route calculator 328.

The position and posture calculator 324 calculates, for each object P within the first container 10A, a position and a posture of the holder 140 for picking up the object P, and acquires the calculated position and posture as position and posture information. For example, the position and posture calculator 324 calculates the position and posture of the holder 140 based on the distance image data 360 and/or the 2D image data 362 acquired by the first region sensor 200, the shape data 364 determined by the recognizer 310, which indicates the position, the posture, the shape, etc. of each object P within the first container 10A, pre-input information of the first container 10A, or the like. In a case in which the object P has two or more holding areas in which the object P can be held by the holder 140, the position and posture calculator 324 can calculate the position and posture of the holder 140 for each holding area. The position and posture calculator 324 can calculate a score for each calculated position and posture. The position and posture calculator 324 may calculate the score of each position and posture in accordance with any criteria. For example, the position and posture calculator 324 calculates the score of each position and posture based on the distance from the current position to the calculated position of the holder 140, the difference between the current posture and the calculated posture of the holder 140, the inclination of the holder 140 in the calculated posture, etc.

The position and posture calculator 324 writes the acquired position and posture information on the position and posture table 366 stored in the memory unit 306. FIG. 3 is a figure showing the position and posture table 366. The position and posture table 366 includes columns of the "position and posture information No.", the "position and posture information", the "state", and the "score". The column of the "position and posture information No." describes an identification number of the position and posture information generated by the position and posture calculator 324. The column of the "position and posture information" describes the content of the position and posture information generated by the position and posture calculator 324. The column of the "state" describes the execution state of the holding operation based on corresponding position and posture information. For example, it describes "success" in a case in which a holding operation based on the corresponding position and posture information has succeeded, it describes "failure" in a case in which the holding operation has failed, and it describes "undetermined" in a case in which the holding operation has not yet performed. The column of the "score" describes the score of each position and posture calculated by the position and posture calculator 324.

Likewise, the position and posture calculator 324 can calculate a position and posture of the holder 140 in the second container 10B for releasing the object P transported to the second container 10B, and acquire the calculated position and posture as position and posture information. For example, the position and posture calculator 324 calculates a position and posture of the holder 140 for releasing the object P in the second container 10B based on the distance image data 360 and/or the 2D image data 362 of the second container 10B acquired by the second region sensor 210, the shape data 364 generated by the recognizer 310, pre-input information of the second container 10B. For example, the position and posture calculator 324 calculates the position and posture for releasing the object P so as not to interfere with the object P which was already disposed in the second container 10B.

The position and posture selector 326 selects a position and posture for generating a holding operation plan among the positions and postures calculated by the position and posture calculator 324. A selection criteria of the position and posture by the position and posture selector 326 is not limited particularly. For example, the position and posture selector 326 can select the position and posture whose column of the "state" is "undetermined" and which has the largest value in the column of the "score" among the positions and postures listed in the position and posture table 366. That is, the position and posture selector 326 can exclude, from the subject(s) of the selection, the positions and postures by which the holding operation has already succeeded or failed (i.e. the "state" is "success" or "failure"), and set the priority of the positions and postures in the order of the magnitude of the "score".

The route calculator 328 calculates a travelling route for picking up and transporting the object P by the holder 140 based on the position and posture selected by the position and posture selector 326, and acquires the calculated travelling route as route information 368. The format of the route information 368 is not limited particularly. For example, it may be represented by a set of many spatial coordinates which are substantially continuous along the route, or represented by a set of a few spatial coordinates which show only representative waypoints of the route.

Figure 4:
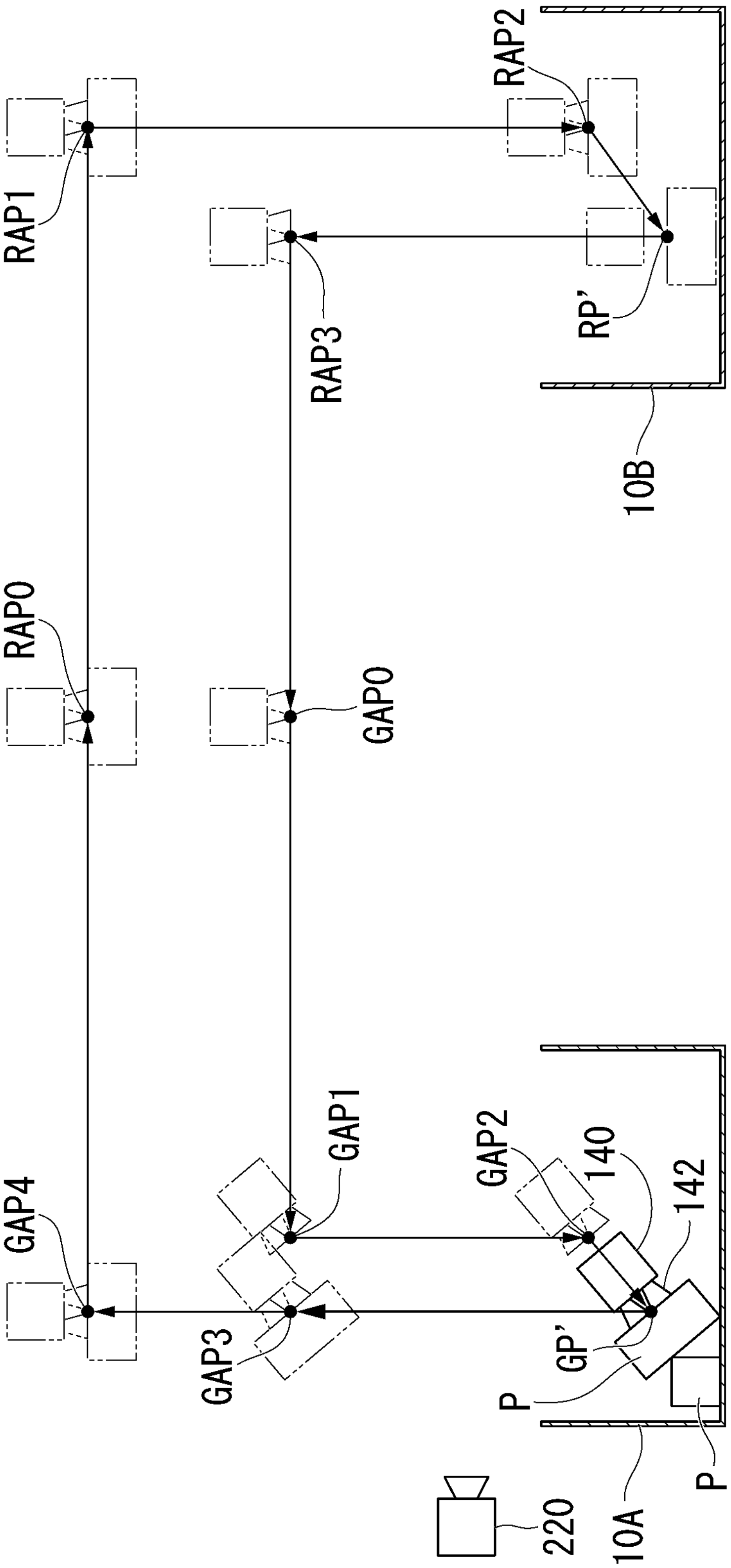
FIG. 4 is a schematic figure showing an example of route information in the picking process by the picking system according to the embodiment.

FIG. 4 is a schematic figure showing an example of route information in the picking process by the picking system 1. In the example shown in FIG. 4, the route information 368 is represented by a set of spatial coordinates of 11 waypoints. The travelling route of the holder 140 is, for example, a route obtained by connecting 11 waypoints in sequence with straight lines. In a case in which the initial position of the holder 140 is GAP0, in FIG. 4, the holder 140 travels along a route of GAP0→GAP1→GAP2→GP'→GAP3→GAP4→RAP0→RAP1→RAP2→RP'→RAP3→GAP0→ . . . .

The motion controller 314 controls a motion of the picking device 100 based on the position and posture information of the holder 140 and/or the route information 368. For example, the motion controller 314 controls motions of the base body 110, the arms 120, the joints 130, and the holder 140 by driving power source such as motor provided on the picking device 100. Thereby, the motion controller 314 can cause the holder 140 to travel and pick up and transport the object P in accordance with the route information 368. In addition, the motion controller 314 can drive the suction device 144 in a case in which the object P within the first container 10A is picked up, and stop driving the suction device 144 in a case in which the transported object P is released within the second container 10B.

The failure detector 316 detects a variety of failures in the picking process by the picking device 100. For example, the failure detector 316 can detect a failure in the generation of the holding operation plan by the planner 312. Moreover, the failure detector 316 can detect a failure in performing a holding operation (i.e., a pickup operation or a transport operation on the object P) by the motion controller 314. The failure detector 316 includes a plan determiner 330, a pickup determiner 332, and a holding state monitoring unit 334.

The plan determiner 330 determines whether or not the generation of a holding operation plan by the planner 312 has succeeded. For example, the plan determiner 330 compares the route information 368 generated by the route calculator 328 with the shape data 364 of the first container 10A, and determines whether or not there is an interference in the route. For example, in a case in which it is expected that the holder 140 will contact a wall of the first container 10A or the like if the holder 140 travels along the calculated route, the plan determiner 330 determines that there is an interference in the route, and determines that the generation of the holding operation plan by the planner 312 has failed. In a case in which it is expected that the holder 140 will not contact the first container 10A even if the holder 140 travels along the calculated route, the plan determiner 330 determines that there is no interference in the route, and determined that the generation of the holding operation plan by the planner 312 has succeeded.

The pickup determiner 332 determines whether or not a pickup operation on the object P by the holder 140 has succeeded. For example, in a case in which the motion controller 314 causes the holder 140 to perform the pickup operation on the object P, the pickup determiner 332 determines whether or not the holder 140 has succeeded in picking up the object P with reference to the output result of the holding state sensor 148 provided on the holder 140. For example, in a case in which no change has been observed in the pressure within the holder 140 output from the holding state sensor 148 between before and after the pickup operation, the pickup determiner 332 determines that the holder 140 could not adsorb the object P and that the pickup operation has failed. Moreover, in a case in which the pressure within the holder 140 decreased in the pickup operation and then quickly got back to the pressure before the pickup operation, the pickup determiner 332 determines that the object P has quickly dropped after the holder 140 adsorbed the object P for a moment, and that the pickup operation has failed. In a case in which the pressure within the holder 140 decreased between before and after the pickup operation and thereafter the low value of the pressure has been maintained, the pickup determiner 332 determines that the holder 140 can adsorb the object P appropriately and that the pickup operation has succeeded.

The holding state monitoring unit 334 detects a failure of a transport operation of the object P by monitoring the holding state of the object P by the holder 140. For example, after the pickup operation and while the motion controller 314 is causing the holder 140 to perform the transport operation on the object P, the holding state monitoring unit 334 monitors the pressure within the holder 140 by periodically referring to the output result of the holding state sensor 148. For example, in a case in which the holding state monitoring unit 334 detects the increase of the pressure within the holder 140 during the transport operation, the holding state monitoring unit 334 determines that the holding state of the object P by the holder 140 has changed, and estimates that the transported object P has left and dropped from the holder 140.

The determiner 318 performs a variety of determination in the picking process. For example, in a case in which the failure detector 316 detects a failure in generating the holding operation plan, a failure in performing the pickup operation, or a failure in performing the transport operation, the determiner 318 can determine whether or not a retry is possible and determine a necessary operation for the retry. As used herein, a "retry determination" refers to such a determination process for a retry in a case in which any failure occurs during the picking process. In particular, a "first retry determination" refers to a retry determination in a case in which the generation of the holding operation plan has failed. A "second retry determination" refers to a retry determination in a case in which the pickup operation has failed. A "third retry determination" refers to a retry determination in a case in which the transport operation has failed.

The image comparing unit 320 compares a plurality of pieces of image data. The image comparing unit 320 can extract a common point(s) and a different point(s) between a plurality of pieces of image data.

The position estimator 322 estimates a drop position in a case in which the object P has dropped from the holder 140. For example, the position estimator 322 receives, from the motion controller 314, information of timings at which the holder 140 passed through the waypoints in the route information 368, and receives, from the holding state monitoring unit 334, information of temporal monitoring results of the holding state. The position estimator 322 can estimate a drop position at which the object P has dropped from the holder 140, by comprehensively considering these pieces of information.

The memory unit 306 is provided with a memory and a storage, and stores any information. For example, the memory unit 306 stores a program 350 causing a processor of the control device 300 to execute certain instructions, order information 352 about the holding target object(s) P, a picking list 354, storing unit information 356, object information 358, the distance image data 360, the 2D image data 362, the shape data 364, the position and posture table 366, the route information 368, etc. The picking list 354 is a list of target object(s) P of the picking process, which is generated based on the order information 352. For example, the picking list 354 is a list obtained by dividing the order information 352 by type of the objects P in a case in which the order information 352 includes a plurality of types of objects P. The storing unit information 356 is information of the storing units such as the first container 10A, which stores the object P. For example, the storing unit information 356 is information indicating which type of object(s) P is stored in each storing unit. The object information 358 is information indicating types, numbers, etc. of the objects P stored in the storing unit.

The output unit 308 is provided with an input/output interface, and outputs a result of an arithmetic processing in the processing unit 304, etc. For example, the output unit 308 outputs a control signal, a motor driving signal, etc. by the motion controller 314 for the picking device 100. The output unit 308 may notify a user using texts, an image, sounds or the like.

The managing device 400 manages the operation state of the picking device 100, the order information 352, the stock status of the object P or the like. For example, the managing device 400 can receive the order information 352 from a user, and transmit the order information 352 to the picking device 100 and/or the control device 300. The managing device 400 may generate one or more picking lists 354 for the picking device 100 based on the order information 352. The control device 300 can give a feedback to the managing device 400 about situations of a variety of failures during the picking process. The managing device 400 can generate the next order information 352, based on the feedback information from the control device 300, so as to improve a success rate of the picking process by the picking device 100, or shorten the time required for the picking process.

Figure 5:
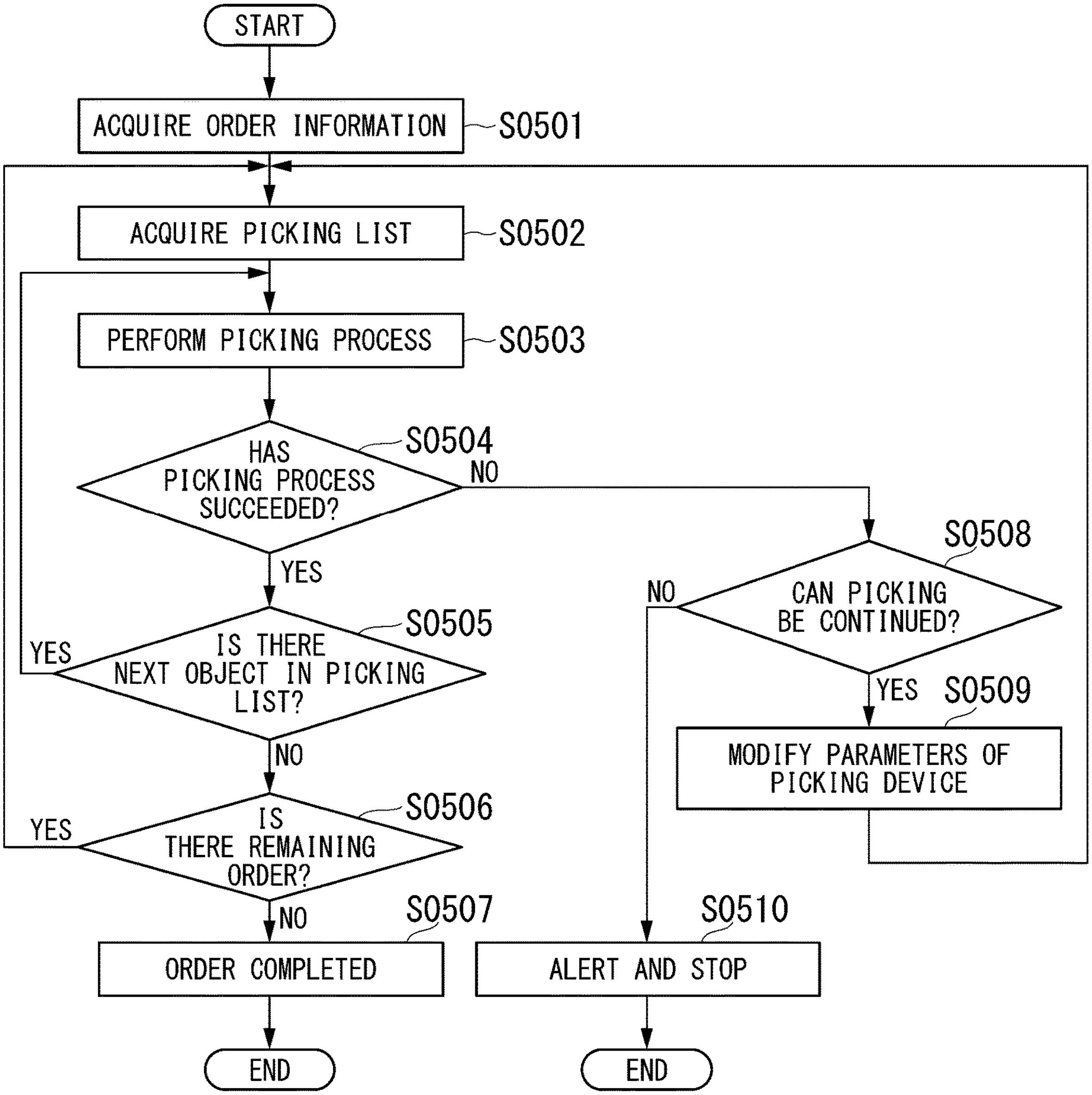
FIG. 5 is a flowchart showing the order process by the picking system according to the embodiment.
Figure 6:
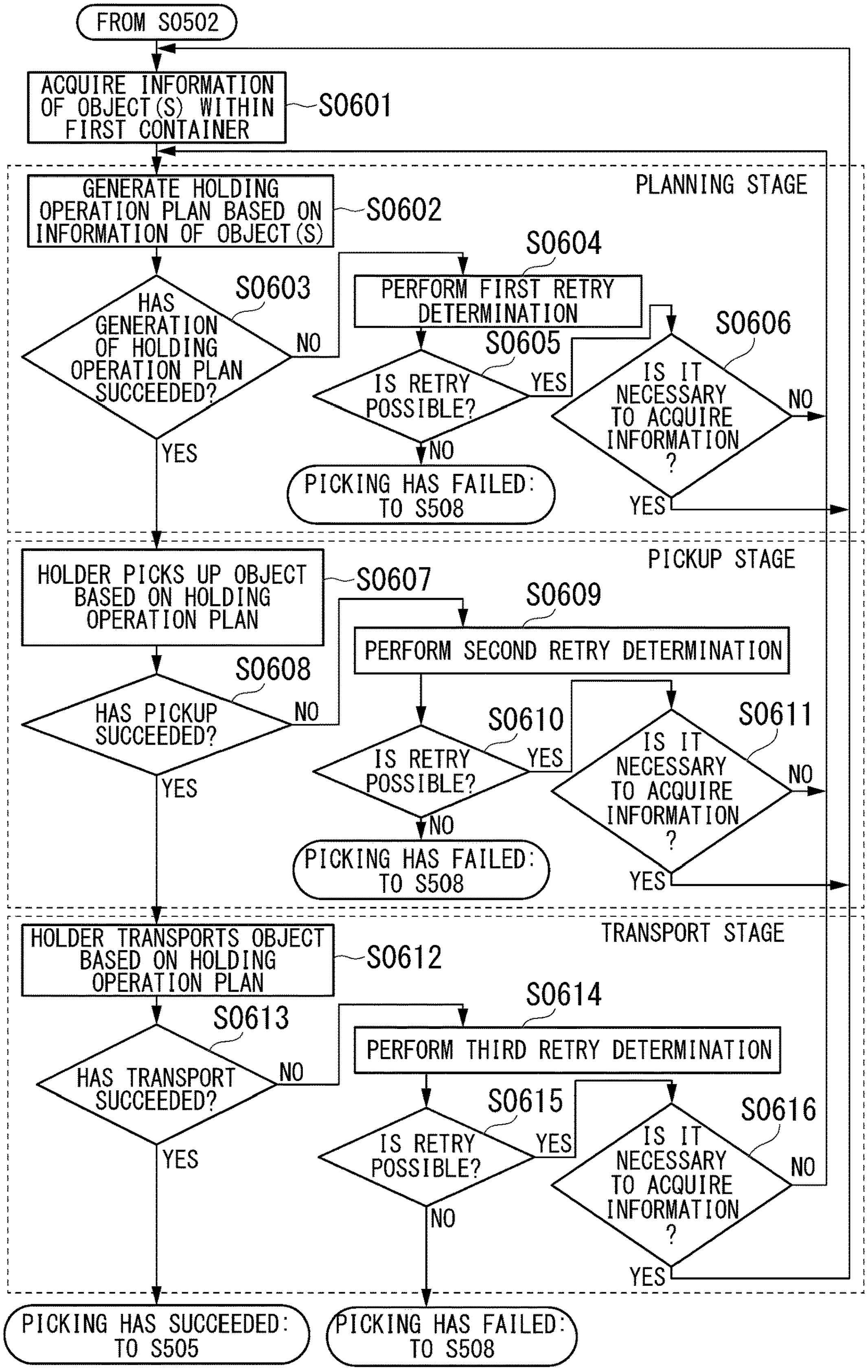
FIG. 6 is a flowchart showing the picking process by the picking system according to the embodiment.
Figure 7:
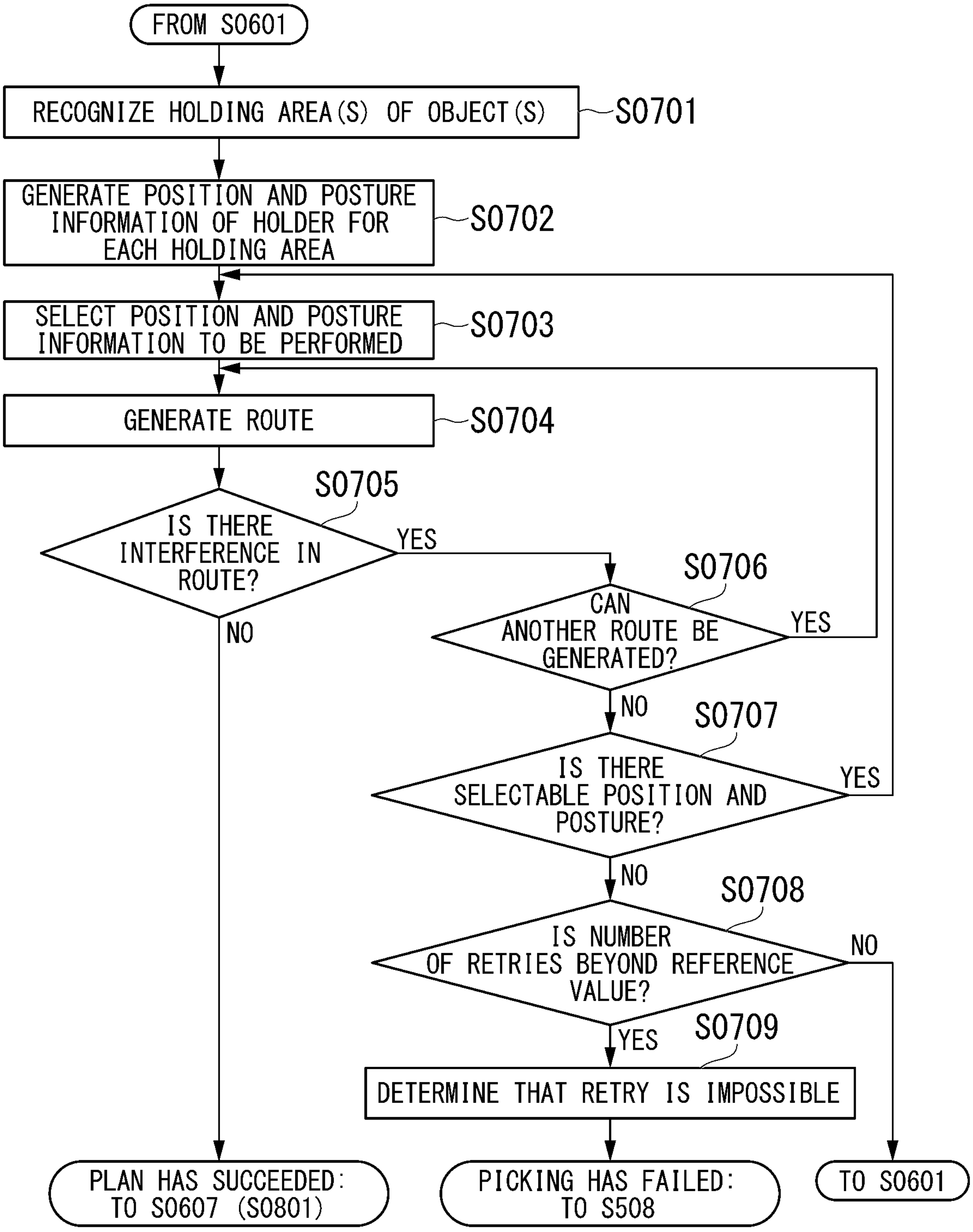
FIG. 7 is a flowchart showing the planning stage of the picking process by the picking system according to the embodiment.
Figure 8:
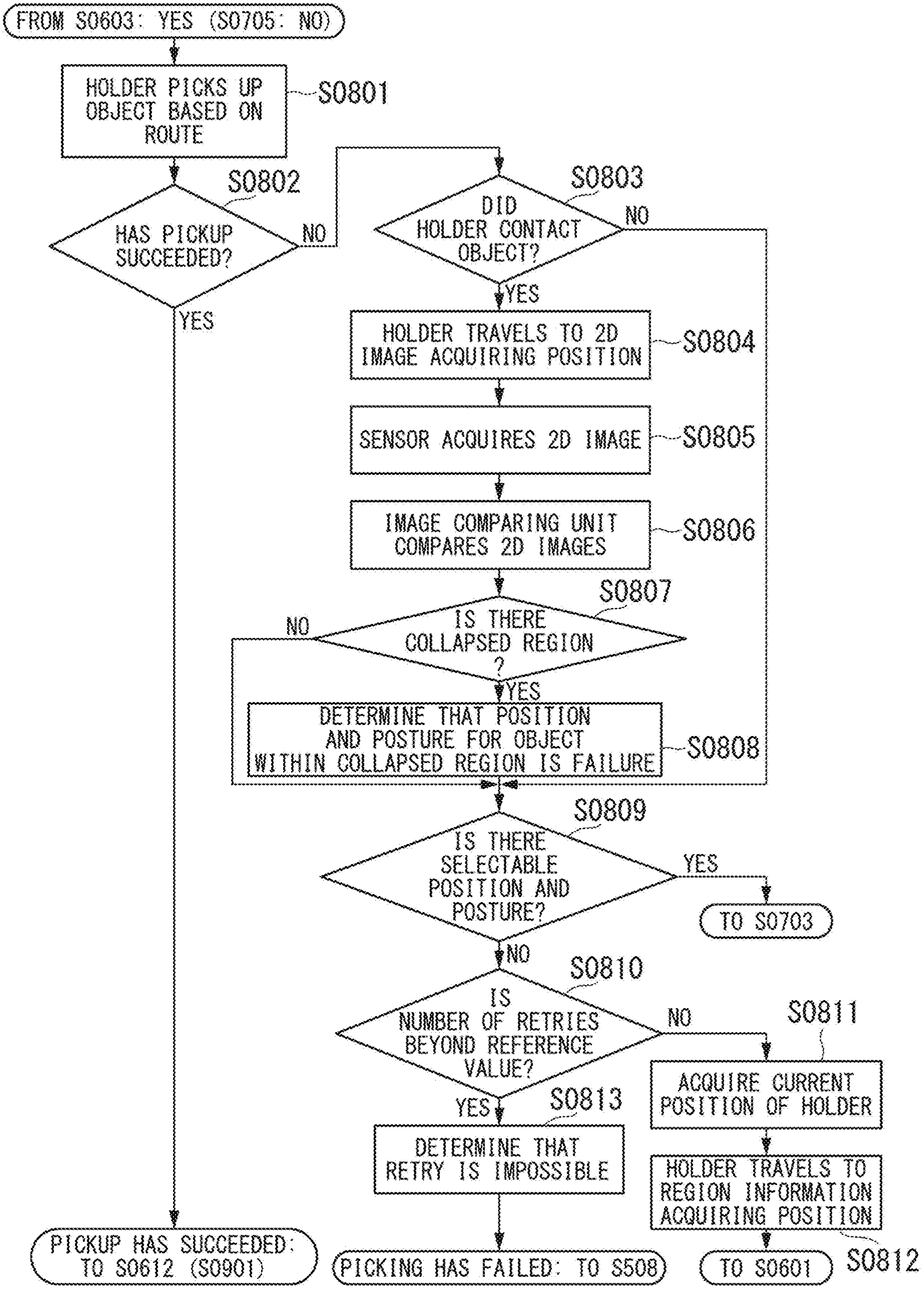
FIG. 8 is a flowchart showing the pickup stage of the picking process by the picking system according to the embodiment.
Figure 9:
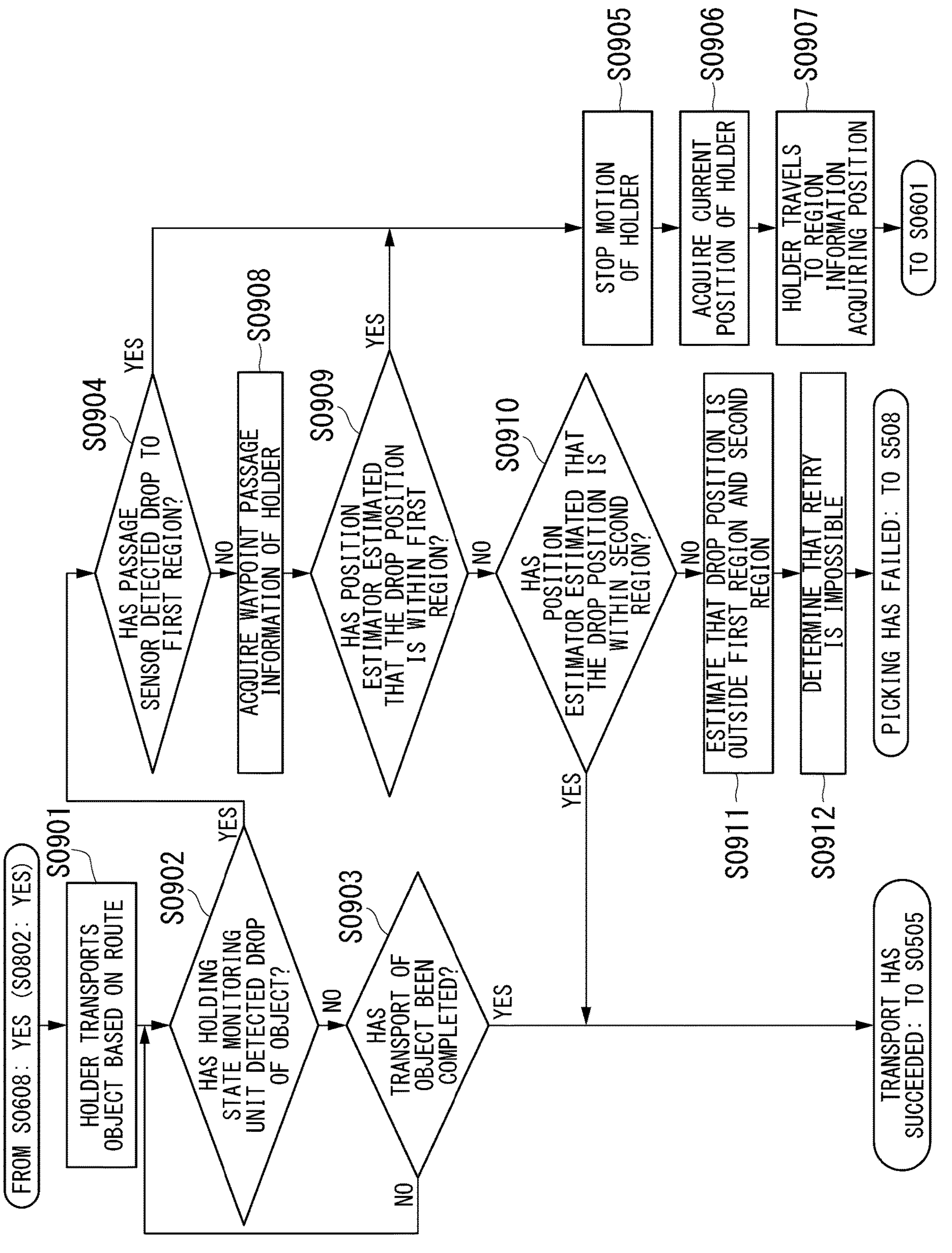
FIG. 9 is a flowchart showing the transport stage of the picking process by the picking system according to the embodiment.

Then, a flow of the picking process by the picking system 1 is described with reference to FIGS. 5 to 9. FIG. 5 is a flowchart showing the order process by the picking system 1 according to the embodiment. FIG. 6 is a flowchart showing the picking process by the picking system 1 according to the embodiment. FIG. 7 is a flowchart showing the planning stage of the picking process by the picking system 1 according to the embodiment. FIG. 8 is a flowchart showing the pickup stage of the picking process by the picking system 1 according to the embodiment. FIG. 9 is a flowchart showing the transport stage of the picking process by the picking system 1 according to the embodiment.

First, the entire flow from the order reception of the picking system 1 to the completion of the order is described with reference to FIG. 5. In step S0501, the input unit 302 receives the order information 352 from the managing device 400 or a user. It should be noted that the managing device 400 may receive the order information 352 from a user. In step S0502, the control device 300 or the managing device 400 generates the picking list 354 based on the order information 352. In a case in which the managing device 400 generates the picking list 354, the managing device 400 transmits the picking list 354 to the control device 300. In step S0503, the control device 300 controls the picking device 100 to perform the picking process based on the acquired picking list 354. In step S0504, the determiner 318 of the control device 300 determines whether or not the picking process by the picking device 100 has succeeded. In a case in which it is determined that the picking process has succeeded (S0504: Yes), in step S0505, the determiner 318 determines whether there is the next picking target object P in the picking list 354. In a case in which it is determined that there is the next object P (S0505: Yes), the control device 300 controls the picking device 100 to perform the picking process of the next object P (S0503). On the other hand, in a case in which it is determined that there is no next object P (S0505: No), that is, in a case in which the picking process of all the objects P in the picking list 354 has been completed, in step S0506, the determiner 318 determines whether or not there is a remaining order with reference to the order information 352. In a case in which it is determined that there is a remaining order (S0506: Yes), the control device 300 or the managing device 400 generates the next picking list 354 (S0502). On the other hand, in a case in which it is determined that there is no remaining order (S0506: No), the output unit 308 notifies the order completion (S0507).

On the other hand, in a case in which it is determined that the picking process has failed (S0504: No) in step S0504, in step S0508, the determiner 318 determines whether or not the picking process can be continued. For example, in a case in which there is possibility that an error occurs in the stock number of the object P, e.g. a case in which it is estimated the object P has dropped outside the first container 10A and the second container 10B, or in a case in which the holder 140 is in an inoperative state, the determiner 318 determines that the picking process cannot be continued (S0508: No). In such a case, the output unit 308 outputs an alert, and the control device 300 aborts the motion control of the picking device 100 (S0510). On the other hand, in a case in which it is determined that the picking process can be continued (S0508: Yes), there is possibility that the object P can be held by adjusting a variety of parameters of the picking device 100 such as the travelling speed of the picking device 100, the holding force by the holder 140 (e.g., the suction power of the suction device 144 and/or the pinching force using the pinching hand), etc. Then, in step S0509, the control device 300 or the managing device 400 generates updated parameter information, and, back to step S0502, generates a new picking list 354 for picking the objects P to the number of unfinished picking processes.

Accordingly, the picking system 1 repeats the picking processes until the order is completed or it is determined that the picking process cannot be continued.

Next, the detail flow of the picking process (S0503) and the success determination (S0504) is described with reference to FIG. 6. As shown in FIG. 6, after the control device 300 acquires the picking list 354 in step S0502, the first region sensor 200 acquires information of the object(s) P within the first container 10A in step S0601. For example, the first region sensor 200 acquires the distance image data 360 of the first container 10A by imaging a region including the first container 10A at various depths. The distance image data 360 includes information of the object(s) P within the first container 10A. Likewise, the second region sensor 210 acquires information of the object(s) P within the second container 10B, for example as the distance image data 360.

Then, the flow proceeds to the planning stage. In step S0602, the planner 312 generates a holding operation plan for pickup and transport of the object P by the holder 140 based on the distance image data 360. In step S0603, the plan determiner 330 of the failure detector 316 determines whether or not the generation of the holding operation plan has succeeded. In a case in which it is determined that the generation of the holding operation plan has failed (S0603: No), in step S0604, the determiner 318 performs a first retry determination for deciding whether or not a retry is possible and deciding an operation for a retry. In a case in which it is determined that a retry is impossible as a result of the first retry determination (S0605: No), the determiner 318 determines that the picking has failed, proceeding to step S0508 (FIG. 5). On the other hand, in a case in which it is determined that a retry is possible as a result of the first retry determination (S0605: Yes), in step S0606, the determiner 318 determines whether or not it is necessary to acquire information of the object(s) P within the first container 10A. In a case in which it is determined that it is not necessary to acquire information of the object(s) P (S0606: No), back to step S0602, a holding operation plan is generated again. On the other hand, in a case in which it is determined that it is necessary to acquire information of the object(s) P (S0606: Yes), back to step S0601, the first region sensor 200 again acquires information of the object(s) P within the first container 10A. On the other hand, in a case in which it is determined that the generation of the holding operation plan has succeeded (S0603: Yes), the flow proceeds to the pickup stage. In this manner, the picking system 1 repeats the acquisition of information of the object P and/or the generation of the holding operation plan until the generation of the holding operation plan succeeds or it is determined that a retry is impossible.

In the pickup stage, in step S0607, the motion controller 314 generates the control information of the picking device 100 and controls the holder 140 to perform the pickup operation on the object P, based on the generated holding operation plan. In step S0608, the pickup determiner 332 of the failure detector 316 determines whether or not the holder 140 has succeeded in the pickup operation. In a case in which it is determined that the pickup operation has failed (S0608: No), in step S0609, the determiner 318 performs a second retry determination for deciding whether or not a retry is possible and deciding an operation for a retry. In a case in which it is determined that a retry is impossible as a result of the second retry determination (S0610: No), the determiner 318 determines that the picking has failed, proceeding to step S0508 (FIG. 5). On the other hand, in a case in which it is determined that a retry is possible as a result of the second retry determination (S0610: Yes), in step S0611, the determiner 318 determines whether or not it is necessary to acquire information of the object(s) P within the first container 10A. In a case in which it is determined that it is not necessary to acquire the information of the object(s) P (S0611: No), back to step S0602, a holding operation plan is generated again. On the other hand, in a case in which it is determined that it is necessary to acquire information of the object(s) P (S0611: Yes), back to step S0601, the first region sensor 200 again acquires information of the object(s) P within the first container 10A. On the other hand, in a case in which it is determined that the pickup operation has succeeded (S0608: Yes), the flow proceeds to the transport stage. In this manner, the picking system 1 repeats the acquisition of the information of the object(s) P and/or the generation of the holding operation plan until pickup operation has succeeded or it is determined that a retry is impossible.

In the transport stage, in step S0612, the motion controller 314 controls the holder 140 to perform a transport operation on the object P based on the holding operation plan. In step S0613, the holding state monitoring unit 334 of the failure detector 316 detects a failure of the transport operation by the holder 140. In a case in which it is determined that the transport operation has failed (S0613: No), in step S0614, the determiner 318 performs a third retry determination for deciding whether or not a retry is possible and deciding operation for a retry. In a case in which it is determined that a retry is impossible as a result of the third retry determination (S0615: No), the determiner 318 determines that the picking has failed, proceeding to step S0508 (FIG. 5). On the other hand, in a case in which it is determined that a retry is possible as a result of the third retry determination (S0615: Yes), in step S0616, the determiner 318 determines whether or not it is necessary to acquire information of the object(s) P within the first container 10A. In a case in which it is determined that it is not necessary to acquire information of the object(s) P (S0616: No), back to step S0602, a holding operation plan is generated again. On the other hand, in a case in which it is determined that it is necessary to acquire information of the object(s) P (S0616: Yes), back to step S0601, the first region sensor 200 again acquires information of the object(s) P within the first container 10A. On the other hand, in a case in which no failure of the transport operation is detected (S0613: Yes), the determiner 318 determines that the picking has succeeded, proceeding to step S0505 (FIG. 5).

In this manner, the picking system 1 performs the first retry determination, the second retry determination, or the third retry determination in accordance with the type of the failure detected by the failure detector 316, and decides whether or not a retry is possible and decides operation for a retry. In order to decide an operation for a retry, the determiner 318 determines whether or not it is necessary to acquire the information of the object(s) P. In a case in which it is determined that it is necessary to acquire the information of the object(s) P by the first region sensor 200, and in which the picking device 100 is positioned within an imaging region of the first region sensor 200 (e.g., the holder 140 is positioned within or above the first container 10A), the picking device 100 may prevent the first region sensor 200 from imaging the first container 10A. Therefore, in such a case, the motion controller 314 can control the picking device 100 to cause the holder 140 to move (i.e. retract) to a position in which the holder 140 does not prevent the first region sensor 200 from acquiring the information of the first container 10A (the region information acquiring position).

Then, the processing in the planning stage is described further in detail with reference to FIG. 7. As shown in FIG. 7, after the first region sensor 200 acquires the information of the object(s) P within the first container 10A (e.g., the distance image data 360 of the first container 10A) and the second region sensor 210 acquires the information of the object(s) P within the second container 10B (e.g., the distance image data 360 of the second container 10B) in step S0601, the recognizer 310 recognizes a holding area(s) of the object(s) P within the first container 10A in step S0701. In step S0702, the position and posture calculator 324 calculates, for each recognized holding area, a position and posture of the holder 140 for holding the holding area, and stores the calculated position and posture in the position and posture table 366 (see FIG. 3) as position and posture information. In step S0703, the position and posture selector 326 selects position and posture information to be performed among the generated position and posture information. In step S0704, the route calculator 328 calculates a route for the holder 140 to pick up the object P and transport it to the second container 10B based on the current position of the holder 140 and the selected position and posture information, and acquires the calculated route as the route information 368. In step S0705, the plan determiner 330 determines whether or not there is an interference in the calculated route. For example, the plan determiner 330 compares the route information 368 with the shape data 364 of the first container 10A, and determines whether or not the calculated route will physically interfere with the first container 10A. In a case in which it is determined that there is no interference in the route (S0705: No), the determiner 318 determines that the generation of the holding operation plan has succeeded, proceeding to step S0607 in FIG. 6 (i.e., step S0801 of FIG. 8).

On the other hand, in a case in which it is determined that there is an interference in the route (S0705: Yes), the determiner 318 performs a first retry determination. Specifically, in step S0706, the determiner 318 determines whether or not the route calculator 328 can generate another route. In a case in which it is determined that another route can be generated (S0706: Yes), back to step S0704, the route calculator 328 generates another route information 368. On the other hand, in a case in which it is determined that another route cannot be generated (S0706: No), in step S0707, the determiner 318 determines that the state of the currently-selected position and posture information is "failure" in the position and posture table 366 (see FIG. 3). Moreover, the determiner 318 determines whether or not there is any positions and postures which can be selected by the position and posture selector 326. In a case in which it is determined that there is a selectable position and posture (S0707: Yes), back to step S0703, the position and posture selector 326 selects position and posture information. On the other hand, in a case in which it is determined that there is no selectable position and posture (S0707: No), in step S0708, the determiner 318 determines whether or not the number of retries is beyond a certain reference value. The number of retries refers to the number of retry operations which have been performed on the same type of failures detected by the failure detector 316. The reference value can be set arbitrarily. For example, the reference value may be 3, 5, 10, etc. In a case in which it is determined that the number of retries is equal to or less than the reference value (S0708: No), a retry is performed from step S0601, in which the first region sensor 200 again acquires the information of the object(s) P of the first container 10A. On the other hand, in a case in which it is determined that the number of retries is beyond the reference value (S0708: Yes), in step S0709, the determiner 318 determines that a retry is impossible and determines that the picking has failed, proceeding to step S0508 (FIG. 5).

In this manner, in the holding operation plan stage, the picking system 1 repeats the retries of the plan generation until the route information 368 by which a holding operation can be performed is generated or the number of retries is beyond the reference value. In the first retry determination in response to the failure in the plan generation, a specific retry operation is selected in accordance with the situation by a plurality of determination steps S0706, S0707, S0708. For example, in the first retry determination, the determiner 318 performs a retry to calculate another route based on the selected position and posture. In a case in which another route cannot be calculated, the determiner 318 performs a retry to select another position and posture different from the selected position and posture. In a case in which another position and posture cannot be selected, the determiner 318 performs a retry to acquire information of the object(s) P again.

Then, the processing in the pickup stage is described further in detail with reference to FIG. 8. As shown in FIG. 8, after the generation of the holding operation plan including the route information 368 has succeeded in step S0603, in step S0801, the motion controller 314 generates control information based on the holding operation plan, and controls the picking device 100 based on the control information such that the holder 140 performs a pickup operation on the object P within the first container 10A. In step S0802, the pickup determiner 332 determines whether or not the pickup operation has succeeded. For example, in a case in which the holding state sensor 148 detects that the pressure within the holder 140 decreased after the pickup operation and that the pressure-decreased state has been maintained, the pickup determiner 332 deems that the holder 140 picked up the object P and has been maintaining the object P appropriately, and determines that the pickup operation has succeeded. In addition, in a case in which the holding state sensor 148 detects no decrease in the pressure within the holder 140, or in which the holding state sensor 148 detects an increase in the pressure beyond the reference value after the decrease in the pressure was detected, the pickup determiner 332 determines that the pickup operation on the object P by the holder 140 has failed. In a case in which it is determined that the pickup has succeeded (S0802: Yes), the determiner 318 determines a pickup success, proceeding to step S0612 in FIG. 6 (i.e., step S0901 in FIG. 9).

On the other hand, in a case in which it is determined that the pickup has failed (S0802: No), the determiner 318 performs a second retry determination for a retry a pickup operation. In step S0803, the determiner 318 determines whether or not the holder 140 contacted the object P. For example, the determiner 318 determines whether or not the holder 140 contacted the object P based on the output from the contact sensor 146. It should be noted that in a case in which the determination based on the output of the contact sensor 146 is difficult, it is preferable from the viewpoint of safety to determine that the contact has occurred. In a case in which it is determined that the holder 140 contacted the object P (S0803: Yes), in step S0804, the motion controller 314 controls the picking device 100 such that the holder 140 travels to a position at which the holder 140 does not prevent the first region sensor 200 from acquiring the information of the object(s) P within the first container 10A. For example, the motion controller 314 instructs the picking device 100 to cause the holder 140 to travel outside an imaging region of the first region sensor 200 for the first container 10A such that the holder 140 is not positioned within the imaging region. In step S0805, the first region sensor 200 acquires the 2D image data 362 of the first container 10A and the object(s) P within the first container 10A by imaging a region including the first container 10A. In step S0806, the image comparing unit 320 compares the acquired 2D image data 362 with the image data taken before the pickup operation. The image data taken before the pickup operation may be the 2D image data 362 generated from the distance image data 360 acquired in step S0601, or be the 2D image data 362 acquired by the first region sensor 200 in step S0601, separately from the distance image data 360. Alternatively, the first region sensor 200 may acquire the 2D image data 362 of the first container 10A before step S0801. As a result of comparing the 2D image data 362 between before and after the pickup operation, in step S0807, the image comparing unit 320 determines whether or not there is any region in which the position of the object P has changed within the first container 10A (hereafter referred to as a "collapsed region C"), and identifies a collapsed region C in a case in which there is the collapsed region C. In a case in which it is determined that there is the collapsed region C (S0807: Yes), in step S0808, the determiner 318 determines that the state of the position and posture information for the object(s) P within the collapsed region C is "failure" in the position and posture table 366 (see FIG. 3). In a case in which it is determined that there is no collapsed region C (S0807: No), the "failure" determination is not performed. Then, in step S0809, the determiner 318 determines whether or not there is any selectable position and posture. In a case in which it is determined that there is a selectable position and posture (S0809: Yes), back to step S0703, the position and posture selector 326 again selects position and posture information. On the other hand, in a case in which it is determined that there is no selectable position and posture (S0809: No), in step S0810, the determiner 318 determines whether or not the number of retries is beyond a certain reference value. In a case in which it is determined that the number of retries is equal to or less than the reference value (S0810: No), in step S0811, the input unit 302 acquires the current position of the holder 140 from the first region sensor 200, a position sensor provided on the holder 140, etc. In step S0812, the motion controller 314 controls the picking device 100, based on the position information of the holder 140, such that the holder 140 travels to a region information acquiring position at which the holder 140 does not prevent the first region sensor 200 from acquiring information. Thereafter, a retry is performed from step S0601, in which the first region sensor 200 again acquires information of the object(s) P of the first container 10A. On the other hand, in a case in which it is determined that the number of retries is beyond the reference value (S0810: Yes), in step S0813, the determiner 318 determines that a retry is impossible and determines that the picking has failed, proceeding to step S0508 (FIG. 5).

On the other hand, in a case in which it is determined that the holder 140 did not contact the object P (S0803: No), the determiner 318 determines that the position(s) of the object(s) P within the first container 10A has not changed between before and after the pickup operation. In such a case, the flow proceeds to step S0809 without performing the determination step of the collapsed region C, and in a case in which there is a selectable position and posture, the position and posture is selected to again generate a holding operation plan. In this manner, the picking system 1 can determine whether or not the position(s) of the object(s) P within the first container 10A has changed between before and after the pickup operation, based on whether or not the holder 140 contacted the object P. In a case in which it is determined that the contact occurred, the calculated position and posture information for the object P whose position has changed is no longer valid. Thus, the determiner 318 determines whether or not there is any available position and posture information which has already been calculated, e.g. by the above determination of the collapsed region C. For the object P whose position has not changed, the already-calculated position and posture information can be used. Thus, a retry of a pickup operation on another object P can be performed with no need for reacquisition of the information of the object P and recalculation of the position and posture information.

In this manner, in the pickup stage, the picking system 1 repeats retries of a pickup operation until the pickup operation succeeds or the number of retries is beyond the reference value. In the second retry determination in response to a failure in the pickup operation, a specific retry operation is selected in accordance with the situation by a plurality of determination steps S0802, S0803, S0807, S0809, S0810.

Figure 10:
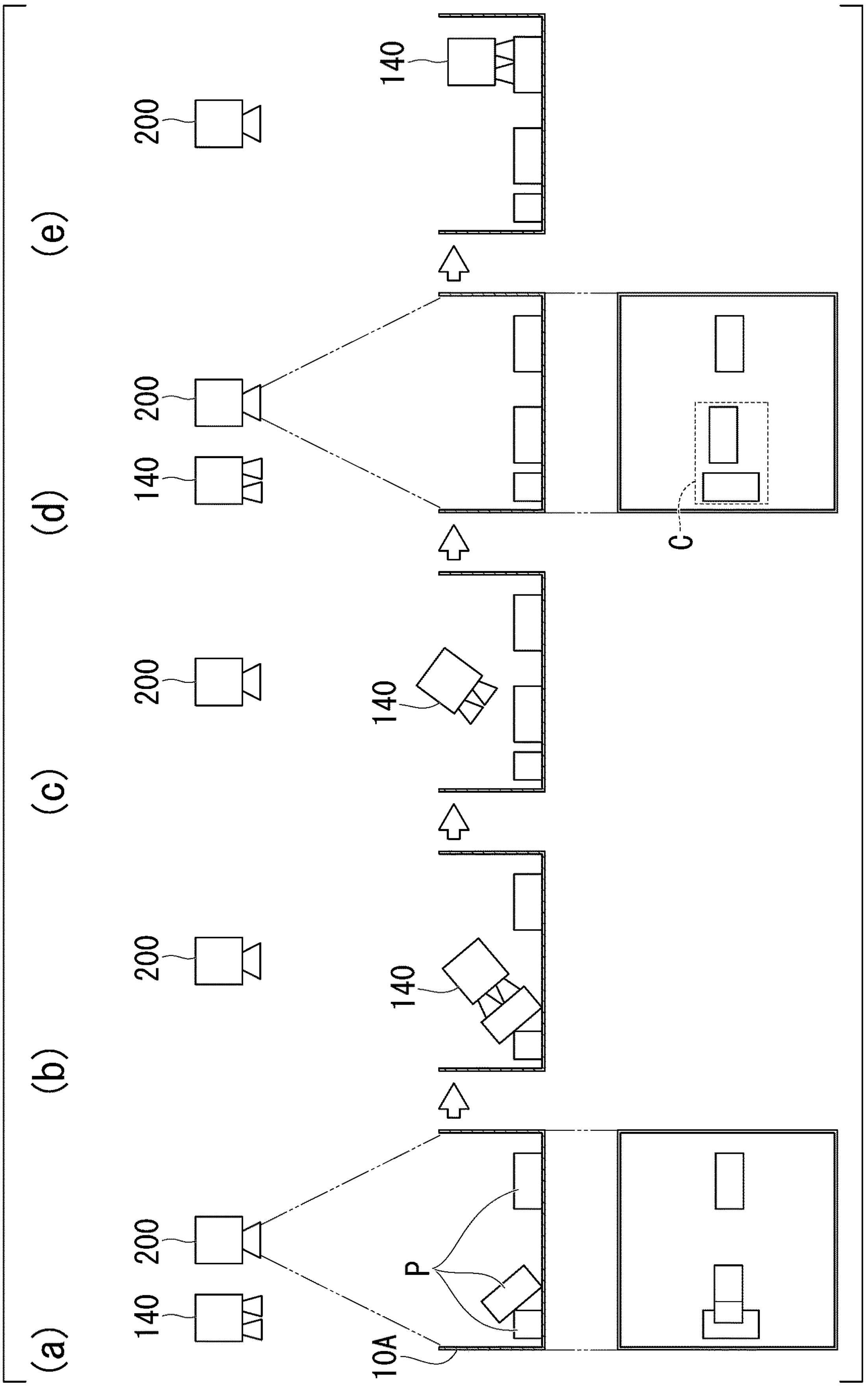
FIG. 10 is a schematic figure showing an example of a motion in a second retry determination by the picking system according to the embodiment.

Here, the determination of the collapsed region C in steps S0804 to S0808 is described with reference to FIG. 10. FIG. 10 is a schematic figure showing an example of a motion in the second retry determination by the picking system 1 according to the embodiment. FIG. 10 divides a flow of the determination of the collapsed region C in a case in which the pickup operation has failed, into five stages (a) to (e). In the first stage (a), the first region sensor 200 acquires the 2D image data 362 of the first container 10A from above. The lower part of the figure shows a schematic figure of the acquired 2D image data 362. In the second stage (b), the holder 140 performs a pickup operation on the object P. In the third stage (c), the pickup operation fails and the object P leaves the holder 140. In the fourth stage (d), after the holder 140 retracted to the region information acquiring position, the first region sensor 200 acquires the 2D image data 362 of the first container 10A from above. The lower part of the figure shows a schematic figure of the acquired 2D image data 362. The image comparing unit 320 compares the 2D image data 362 acquired in the first stage (a) with the 2D image data 362 acquired in the fourth stage (d) to identify a region in which the position(s) of the object(s) P has changed as the collapsed region C. The determiner 318 determines that the state of the position and posture information for the objects P within the collapsed region C is "failure". Thus, the position and posture information which can be selected by the position and posture selector 326 is only the position and posture information for the right object P. Thus, in the fifth stage (e), the holder 140 picks up the right object P as a retry of a pickup operation. According to the above determination process to identify the collapsed region C, the 2D image data 362 is used, which can be acquired in a shorter time than the distance image data 360 required to recalculate the position and posture information. Accordingly, time for a retry process can be shortened. It should be noted that in a case in which it can be determined obviously that collapse has occurred, e.g. in a case in which there is a small number of objects P within the first container 10A, the picking system 1 may omit the collapse determination process, returning back to step S0601 in which information of the object P is acquired.

Then, the processing in the transport stage is described further in detail with reference to FIG. 9. As shown in FIG.

9, after the pickup operation on the object P has succeeded in step S0608, in step S0901, the motion controller 314 controls the picking device 100 such that the holder 140 transports the picked-up object P to the second container 10B, based on the holding operation plan including the route information 368. During the transport operation, the holding state monitoring unit 334 monitors the holding state of the object P by the holder 140 (S0902). In a case in which it is determined that the transport of the object P to the second container 10B has been completed without the detection of a drop of the object P by the holding state monitoring unit 334 (S0903: Yes), the determiner 318 determines that the state of the currently-selected position and posture information is "success" in the position and posture table 366 (see FIG. 3), proceeding to step S0505. The completion of the transport may be determined based on, for example, an image of the second container 10B acquired by the second region sensor 210, information from the position sensor provided on the holder 140, a change in the adsorption state of the adsorber 142 which is detected by the holding state sensor 148, etc.

On the other hand, in a case in which the holding state monitoring unit 334 detects a drop of the object P (i.e., the transport has failed) (S0902: Yes), the determiner 318 performs a third retry determination for a retry of the transport operation. In step S0904, the determiner 318 determines whether or not the passage sensor 220 detects a drop of the object P within the first container 10A. The passage sensor 220 can detect a passage of the object above the first container 10A. Thus, in a case in which a passage of any object is detected after the holder 140 passed through a detection region of the passage sensor 220, or in a case in which it is detected that the holder 140 holds nothing when the holder 140 passes through a detection region of the passage sensor 220 (e.g., the passage sensor 220 detects only the shape of the adsorber 142 at the end of the holder 140, not detecting the shape of the object P), the position estimator 322 estimates that the object P held by the holder 140 has dropped from the holder 140 to the first container 10A. Here, in a case in which the object P drops onto the first container 10A, it is expected that a position of each object P within the first container 10A changes due to an impact of the drop. Thus, in a case in which a drop of the object P is detected by the passage sensor 220 (S0904: Yes), the motion controller 314 stops a motion of the holder 140 (S0905) and acquires the current position of the holder 140 (S0906). In a case in which the holder 140 is within the imaging region of the first region sensor 200, the motion controller 314 controls the picking device 100 such that the holder 140 retracts to the region information acquiring position in order to again acquire the information of the first container 10A by the first region sensor 200. Then, a retry is performed from step S0601, in which the first region sensor 200 again acquires the information of the object(s) P of the first container 10A. It should be noted that, before returning back to step S0601, the picking system 1 may acquire the 2D image data 362 to identify the collapsed region C, as in the pickup stage, and in a case in which there is an object P whose position is unchanged within the first container 10A, the picking system 1 may perform a retry using the position and posture information of the object P.

In a case in which the passage sensor 220 has not detected a drop of the object P (S0904: No), in step S0908, the position estimator 322 acquires waypoint passage information of the holder 140 from the motion controller 314. For example, in a case in which the route information 368 is specified by 11 waypoints as shown in FIG. 4, the motion controller 314 controls the picking device 100 such that the holder 140 travels through the waypoints sequentially. The position estimator 322 acquires timing at which the holder 140 passes through each waypoint, as waypoint passage information, based on the control history of the motion controller 314, a position sensor provided on the holder 140, etc. In step S0909, the position estimator 322 estimates the position at which the object P has dropped by comparing the waypoint passage information with the timing at which the holding state monitoring unit 334 has detected the drop of the object P.

Figure 11:
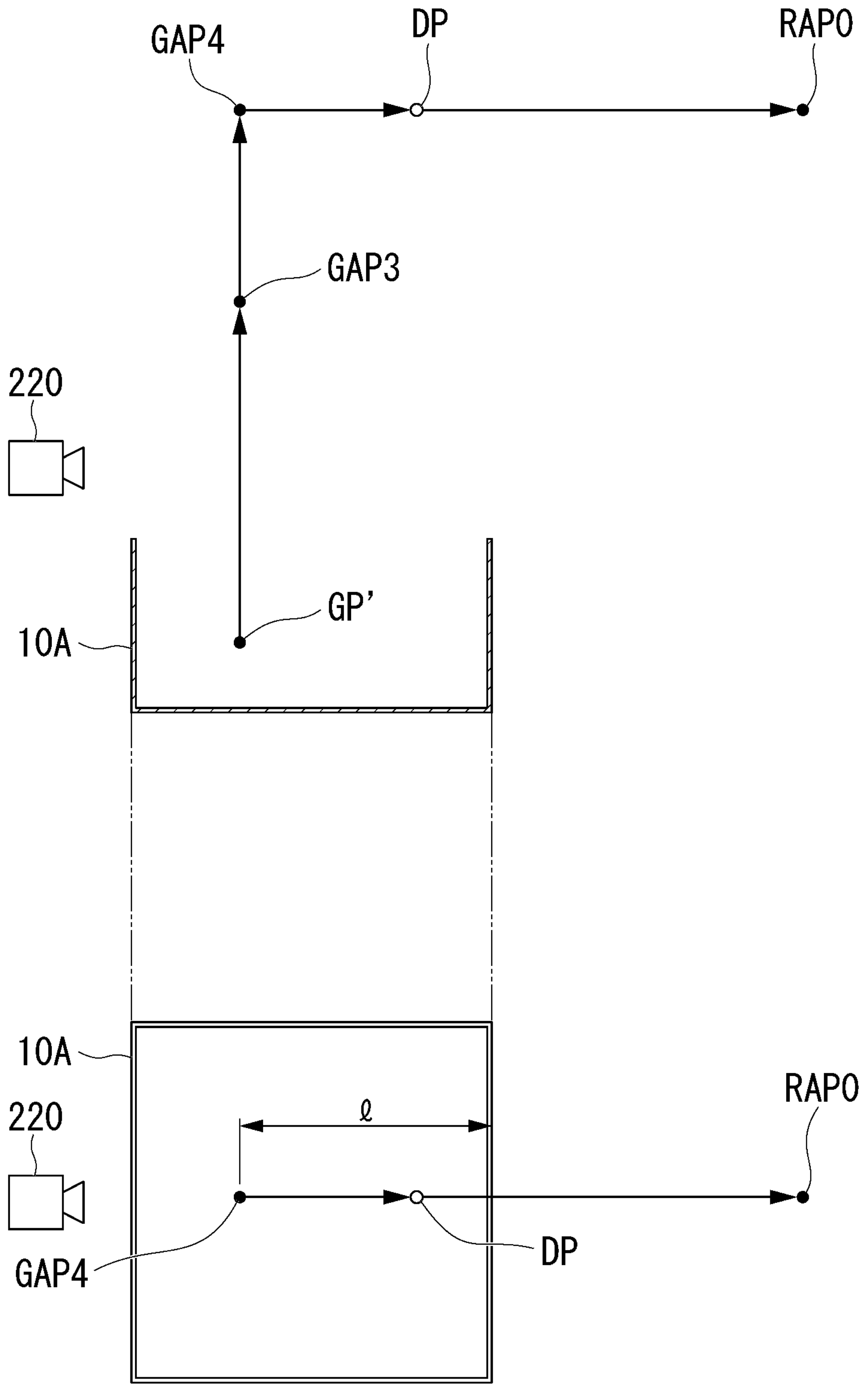
FIG. 11 is a schematic figure showing an example of a motion in a third retry determination by the picking system according to the embodiment.

Here, the estimation processing of the drop position by the position estimator 322 is described with reference to FIG. 11. FIG. 11 is a schematic figure showing an example of a motion in a third retry determination by the picking system 1 according to the embodiment. FIG. 11 shows the waypoints GP', GAP3, GAP4, RAP0 included in the route information 368, and the position DP at which the object P dropped from the holder 140. The waypoint passage information includes information of the timings $t_{GP'}$, $t_{GAP3}$, $t_{GAP4}$ at which the holder 140 passed through the waypoints GP', GAP3, GAP4. It should be noted that in a case in which the holder 140 continues to travel after the drop of the object P, the waypoint passage information may include information of the timing $t_{RAP0}$ at which the holder 140 passes the waypoint RAP0. On the other hand, the holding state monitoring unit 334 outputs information of the timing $t_{DP}$ at which it is estimated that the object P dropped. The position estimator 322 acquires the waypoint GAP4 immediately before the drop position DP and the waypoint RAP0 immediately after the drop position DP from the route information 368 by comparing these timings. Thereby, the position estimator 322 estimates that the object P dropped from the holder 140 between the two waypoints GAP4, RAP0. The position estimator 322 can estimate the drop position of the object P in further detail. For example, the position estimator 322 acquires the travelling speed of the holder 140 based on the control information by the motion controller 314, etc. The position estimator 322 calculates a permissible time $t=1/v$ based on the travelling speed v of the holder 140 and the distance 1 from the waypoint GAP4 immediately before the drop position DP to an edge of the first container 10A on the route. For example, the position estimator 322 can estimate the drop position of the object P as follows, based on the permissible time t, the timing $t_{GAP4}$ of the passage through the waypoint GAP4 immediately before the drop position DP, and the timing $t_{DP}$ at which the holding state monitoring unit 334 detected the drop of the object P.

(1) $t_{DP}<t_{GAP4}+t$: estimating that the drop position is within the first container 10A (2) $t_{GAP4}+t \le t_{DP}<t_{RAP1}$: estimating that the drop position is outside the first container 10A and the second container 10B (3) $t_{RAP1} \le t_{DP}$: estimating that the drop position is within the second container 10B It should be noted that the estimating method of the drop position by the position estimator 322 is not limited to the above example. For example, in the example shown in FIG. 4, the position estimator 322 may estimate that the object P has dropped within the first container 10A in a case in which the drop detection timing at which the holding state monitoring unit 334 detects the drop is before passing through the waypoint GAP4. The position estimator 322 may estimate that the object P has dropped outside the first container 10A and the second container 10B in a case in which the drop detection timing is after passing through the waypoint GAP4 and before passing through the waypoint RAP1. The position estimator 322 may estimate that the object P has dropped within the second container 10B in a case in which the drop detection timing is after passing through the waypoint RAP1. Moreover, the route calculator 328 may set boundary waypoints which are a boundary between the inside and outside of the first container 10A and a boundary between the inside and outside of the second container 10B in addition to 11 waypoints in FIG. 4, in the generation of the route information 368. The position estimator 322 may estimate the drop position based on the boundary waypoints. In addition, the position estimator 322 may calculate a travel distance from the waypoint GAP4 instead of calculating the permissible time t, and compare it with the distance 1 in FIG. 11 in their magnitudes.

Back to the flow in FIG. 9, the picking system 1 can select a retry operation based on the estimation result by the position estimator 322. Specifically, in a case in which the position estimator 322 estimates that the drop position of the object P is within the first container 10A (S0909: Yes), the flow proceeds to step S0905, as in a case in which the passage sensor 220 detects a drop within the first container 10A. In a case in which the position estimator 322 estimates that the drop position of the object P is within the second container 10B (S0910: Yes), the determiner 318 determines that the object P has been transported to the second container 10B, which is the transport destination, and thus the transport has been completed, proceeding to step S0505. In a case in which the position estimator 322 estimates that the drop position of the object P is outside of the first container 10A and the second container 10B (S0911), in step S0912, the determiner 318 determines that a retry is impossible and determines that the picking has failed, proceeding to step S0508 (FIG. 5).

In this manner, in the transport stage, the picking system 1 repeats retries of the transport operation until the transport operation succeeds or it is estimated that the object P has dropped outside the first container 10A and the second container 10B. In the third retry determination in response to a failure in the transport operation, a specific retry operation is selected dependent on the situation by a plurality of determination steps S0904, S0909, S0910. For example, the determiner 318 can determine the situation in accordance with whether the drop position of the object P estimated by the position estimator 322 is within the first container 10A, within the second container 10B, or outside the first container 10A and the second container 10B, to decide the next action.

According to the above-described embodiment, the picking system 1 can detect a failure by the failure detector 316 in each of the planning stage, the pickup stage, and the transport stage, perform different retry determinations dependent on the stage, and decide an appropriate retry operation in accordance with the state in which a failure occurred. The picking system 1 can transit to an appropriate state based on the state of the picking device 100 and/or information from the sensor in a case in which an error occurs, and thereby it is possible to reduce useless retry motions, speed up the picking process, and prevent a forced outage such as breakage of an object from occurring to improve the productivity.

Moreover, the picking system 1 can determine whether or not there is a retry operation which can be performed using the already-calculated position and posture information, before performing a time-consuming process such as reacquisition of the distance image data 360 and recalculation of the position and posture information. In a case in which there is such a retry operation, the picking system 1 performs the retry operation in preference to reacquisition of the distance image data 360 and recalculation of the position and posture information. For example, the picking system 1 can determine, by the determiner 318, whether or not there is an object P whose position has not changed since the previous information acquisition, among the objects P within the first container 10A. In a case in which there is an object P whose position has not changed, the picking system 1 can preferentially perform the picking process of the object P using the already-calculated position and posture information. Thereby, it is possible to perform an efficient picking operation.

According to one embodiment, in the second retry determination, the determiner 318 determines whether or not the position of the object P within the first container 10A (first region) has changed between before and after the pickup operation. According to this constitution, the efficiency of the picking operation is improved by preferentially attempting a retry for the object P whose position has not changed.

According to one embodiment, in the second retry determination, the determiner 318 determines whether or not the holder 140 contacted the object P, and determines that the position of the object P within the first container 10A (first region) has not changed between before and after the pickup operation in a case in which the determiner 318 determines that the holder 140 did not contact the object P. According to this constitution, it is possible to conveniently determine whether the position has changed by the detection result from the contact sensor 146, thereby further improving the efficiency of the picking operation.

According to one embodiment, in the second retry determination, the input unit 302 (acquirer) acquires an image of the object P within the first container 10A (first region) in a case in which the determiner 318 determines that the position of the object P within the first container 10A (first region) has changed between before and after the pickup operation. According to one embodiment, the image is a 2D image at least partially including the first container 10A (first region), and in the second retry determination, the determiner 318 identifies a region C in which the position of the object P within the first container 10A (first region) has changed between before and after the pickup operation, based on the 2D image. According to this constitution, it is possible to conveniently distinguish the object P whose position has changed and the object P whose position has not changed, by the 2D image data 362, which can be acquired more conveniently than the distance image data 360 required for the position and posture calculation.

According to one embodiment, the planner 312 comprises a position and posture calculator 324 configured to calculate one or more positions and postures of the holder 140 for picking up the object P based on the information, and a position and posture selector 326 configured to select a position and posture for generating a holding operation plan from one or more positions and postures, and in the second retry determination, the position and posture selector 326 excludes the position and posture for picking up the object P within the identified region, from a subject of the selection. According to this constitution, the efficiency of the picking operation is further improved by preferentially attempting a retry for the object P whose position has not changed by the pickup operation.

According to one embodiment, in the second retry determination, the input unit 302 (acquirer) acquires distance image data 360 at least partially including the first container 10A (first region) in a case in which there is no position and posture which can be selected by the position and posture selector 326, and the position and posture calculator 324 recalculates one or more positions and postures of the holder 140 for picking up the object P based on the distance image data 360. According to this constitution, the efficiency of the picking operation is further improved by performing a retry using the already-calculated position and posture information in preference to acquisition of the distance image data 360 and recalculation of position and posture.

According to one embodiment, the planner 312 comprises a position and posture calculator 324 configured to calculate one or more positions and postures of the holder 140 for picking up the object P based on the information, a position and posture selector 326 configured to select a position and posture for generating the holding operation plan from the one or more positions and postures, and a route calculator 328 configured to calculate a route in which the holder 140 travels, based on the position and posture selected by the position and posture selector 326. According to one embodiment, in a case in which the failure detector 316 detects a failure in the calculation of the route by the route calculator 328, in the first retry determination, the determiner 318 determines whether or not it is possible to calculate a route different from the route, based on the position and posture selected by the position and posture selector 326. According to one embodiment, in the first retry determination, the determiner 318 determines whether or not it is possible to select a position and posture different from the selected position and posture in a case in which the determiner 318 determines that it is not possible to calculate a route different from the route. According to this constitution, a retry determination can be performed in the following order of priority: determining whether another route can be calculate without changing the position and posture, and then, in a case in which no route can be calculate, determining whether another position and posture can be selected without newly calculating a position and posture. Thereby, the efficiency of the picking operation is further improved.

According to one embodiment, the determiner 318 performs a third retry determination for deciding an operation for a retry, in a case in which the failure detector 316 detects a failure in the transport operation on the object P by the holder 140, the third retry determination being different from the first retry determination and the second retry determination. According to one embodiment, the controller further comprises a position estimator 322 configured to estimate a drop position in a case in which the object P has dropped during the transport of the object P. According to one embodiment, in the third retry determination, the input unit 302 (acquirer) acquires information of the object P within the first container 10A (first region) in a case in which the position estimator 322 estimates that the drop position is within the first container 10A (first region). According to one embodiment, in the third retry determination, the determiner 318 decides to continue the picking in a case in which the position estimator 322 estimates that the drop position is within a second container 10B (second region) which is a transport destination of the object P. According to this constitution, it is possible to select an optimal retry operation in accordance with a drop position of the object P estimated by the position estimator 322. Thereby, the efficiency of the picking operation is further improved.

According to one embodiment, the input unit 302 (acquirer) acquires an output from the passage sensor 220 configured to detect that the object passes at a certain height above the first container 10A (first region), and in the third retry determination, the position estimator 322 estimates that the object P has dropped within the first container 10A (first region) based on at least the output from the passage sensor 220. According to this constitution, it is possible to conveniently estimate the drop position of the object P without complicated estimation.

According to one embodiment, the determiner 318 determines whether or not it is possible to continue the picking by modifying a motion parameter of the holder 140 in a case in which the planner 312 cannot generate a holding operation plan. According to this constitution, it is possible to perform various retry operations including adjusting the motion parameter(s) of the picking device 100.

Figure 12:
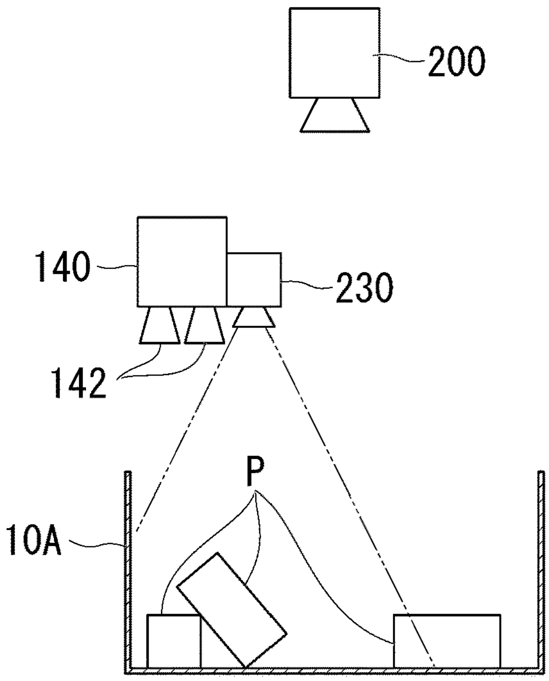
FIG. 12 is a schematic figure showing an example of a motion in a second retry determination by the picking system according to the modification.
Figure 13:
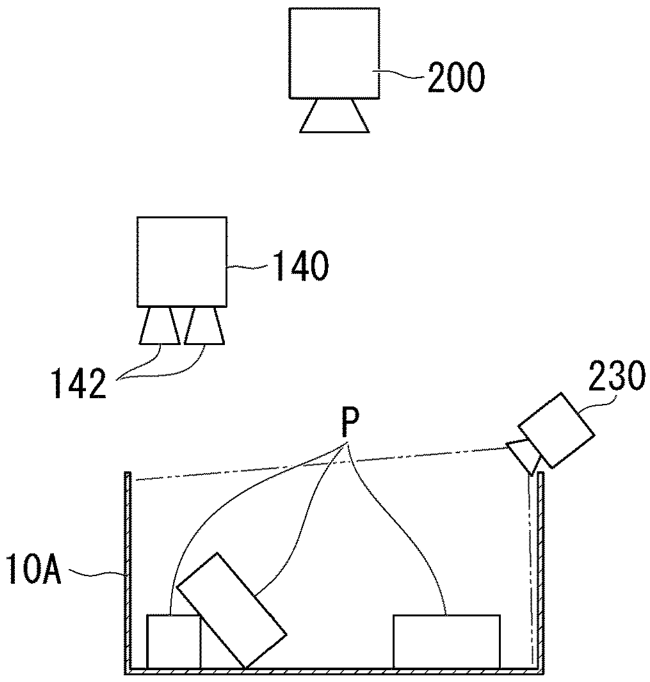
FIG. 13 is a schematic figure showing an example of a motion in a second retry determination by the picking system according to the modification.

Then, modifications to the above embodiment is described with reference to FIGS. 12 and 13. FIGS. 12 and 13 are schematic figures showing an example of a motion in the second retry determination by the picking system 1 according to the modification.

In FIG. 12, the holder 140 has a 2D image sensor 230 (an example of "sensor"). The 2D image sensor 230 is an image sensor which acquires the 2D image data 362. For example, the 2D image sensor 230 can acquire 2D image data 362 of the first container 10A, the second container 10B, the object(s) P, etc., which is imaged from the position of the holder 140. For example, the 2D image sensor 230 can acquire the 2D image data 362 for determining the above-described collapsed region C. In a case in which the 2D image data 362 is acquired using the 2D image sensor 230, the first region sensor 200 does not acquire information. Thus, it is not necessary for the holder 140 to retract to the outside of the imaging region of the first region sensor 200. Therefore, according to the modification, it is possible to omit step S0804 in the above embodiment (see FIG. 8) and conveniently determine the collapsed region C. Thereby, the efficiency of the picking system 1 is further improved.

In FIG. 13, a 2D image sensor 230 (an example of "sensor") is provided on the upper end of the outer wall of the first container 10A. The 2D image sensor 230 acquires 2D image data 362 of the object(s) P within the first container 10A. Preferably, the 2D image sensor 230 can image the entire bottom surface of the first container 10A. In a case in which the 2D image data 362 is acquired using the 2D image sensor 230, the first region sensor 200 does not acquire information. Thus, the holder 140 only has to retract to the outside of the imaging region of the 2D image sensor 230. Since the 2D image sensor 230 images the inside of the first container 10A in an oblique direction from the upper end of the outer wall of the first container 10A, the holder 140 can retract from the imaging region of the 2D image sensor 230 only by travelling upward. On the other hand, in a case in which the first region sensor 200 above the first container 10A takes an image, the holder 140 has to travel so as not to overlap with the position of the first container 10A in a horizontal direction as well. Thus, according to the modification, step S0804 (see FIG. 8) in the above embodiment can be made more conveniently, and it is possible to conveniently determine the collapsed region C. Thereby, the efficiency of the picking system 1 is further improved.

Although the example in which the passage sensor 220 is only provided on the first container 10A has been described above, the second container 10B may also be provided with the passage sensor 220. In such a case, in a case in which the holding state monitoring unit 334 detects a drop of the object P, the position estimator 322 may estimate that the drop is within the first container 10A in a case in which the passage sensor 220 of the first container 10A detects the drop, estimate that the drop is within the second container 10B in a case in which the passage sensor 220 of the second container 10B detects the drop, and estimate that the drop is outside of the first container 10A and the second container 10B in a case in which neither of the passage sensors 220 detects the drop.

The above functional units of the control device 300 do not necessarily have to be embodied by a single control device 300, but a part of the functional units may be embodied by another control device.

According to at least one embodiment as described above, the efficiency of the picking operation can be improved by performing a retry determination which is different dependent on the situation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A picking system for picking an object disposed in a first region, comprising:

- a holder configured to hold the object;
- processing circuitry configured to control a motion of the holder; and
- a sensor configured to acquire information of the object,
- wherein the processing circuitry is configured to:
  - acquire the information from the sensor;
  - calculate one or more positions and postures of the holder for picking up the object based on the acquired information;
  - generate a holding operation plan of holding the object by the holder, based on the acquired information;
  - control a motion of the holder such that the holder performs a pickup operation and a transport operation on the object, based on the holding operation plan;
  - detect a failure in a generation of the holding operation plan or a failure in a holding operation on the object by the holder;
  - perform a first retry determination of deciding an operation for a retry in a case in which the processing circuitry detects the failure in the generation of the holding operation plan, and perform a second retry determination of deciding an operation for a retry in a case in which the processing circuitry detects the failure in the pickup operation on the object by the holder, the second retry determination being different from the first retry determination;
  - determine whether or not there is a selectable one among the one or more positions and postures that have already been calculated, in a case in which it is determined that a retry is possible as a result of the first retry determination or the second retry determination; and
  - in a case where it is determined that there is a selectable position and posture that has already been calculated, determining that it is not necessary to acquire information of the object and generating a new holding operation plan based on the position and posture that has already been calculated.

2. The picking system according to claim 1, wherein the processing circuitry is further configured to, in the second retry determination, determine whether or not a position of the object within the first region has changed between before and after the pickup operation.

3. The picking system according to claim 2, wherein the processing circuitry is further configured to, in the second retry determination, determine whether or not the holder contacted the object, and determine that the position of the object within the first region has not changed between before and after the pickup operation in a case in which the processing circuitry determines that the holder did not contact the object.

4. The picking system according to claim 2, wherein the processing circuitry is further configured to, in the second retry determination, acquire an image of the object within the first region in a case in which the processing circuitry determines that the position of the object within the first region has changed between before and after the pickup operation.

5. The picking system according to claim 4, wherein the image is a two-dimensional image at least partially including the first region, and

- wherein the processing circuitry is further configured to, in the second retry determination, identify a region in which the position of the object has changed in the first region between before and after the pickup operation, based on the 2D image.

6. The picking system according to claim 5, wherein the processing circuitry is further configured to select a position and posture for generating the holding operation plan from the one or more positions and postures,

- wherein the processing circuitry is further configured to, in the second retry determination, exclude the position and posture for picking up the object within the identified region, from a subject of the selection.

7. The picking system according to claim 6, wherein the processing circuitry is further configured to, in the second retry determination, acquire distance image data at least partially including the first region in a case in which there is no position and posture which can be selected by the processing circuitry, and

- wherein the processing circuitry is further configured to recalculate one or more positions and postures of the holder for picking up the object based on the distance image data.

8. The picking system according to claim 1, wherein the processing circuitry is further configured to:

- select a position and posture for generating the holding operation plan from the one or more positions and postures; and
- calculate a route in which the holder travels, based on the selected position and posture.

9. The picking system according to claim 8, wherein the processing circuitry is further configured to, in a case in which the processing circuitry detects a failure in the calculation of the route, in the first retry determination, determine whether or not it is possible to calculate a route different from the route, based on the selected position and posture.

10. The picking system according to claim 9, wherein the processing circuitry is further configured to, in the first retry determination, determine whether or not it is possible to select a position and posture different from the selected position and posture in a case in which the processing circuitry determines that it is not possible to calculate a route different from the route.

11. The picking system according to claim 1, wherein the processing circuitry is further configured to perform a third retry determination for deciding an operation for a retry, in a case in which the processing circuitry detects a failure in the transport operation on the object by the holder, the third retry determination being different from the first retry determination and the second retry determination.

12. The picking system according to claim 11, wherein the processing circuitry is further configured to estimate a drop position in a case in which the object has dropped during the transport operation of the object.

13. The picking system according to claim 12, wherein the processing circuitry is further configured to, in the third retry determination, acquire information of the object within the first region in a case in which the processing circuitry estimates that the drop position is within the first region.

14. The picking system according to claim 12, wherein the processing circuitry is further configured to, in the third retry determination, decide to continue the picking in a case in which the processing circuitry estimates that the drop position is within a second region which is a transport destination of the object.

15. The picking system according to claim 12, wherein the processing circuitry is further configured to acquire an output from a passage sensor configured to detect that the object passes at a certain height above the first region, and wherein the processing circuitry is further configured to, in the third retry determination, estimate that the object has dropped within the first region, based on at least the output from the passage sensor.

16. The picking system according to claim 1, wherein the processing circuitry is further configured to determine whether or not it is possible to continue the picking in a case in which the processing circuitry cannot generate a holding operation plan.

17. A picking device for picking an object, comprising:

a holder configured to hold the object; and processing circuitry configured to control a motion of the holder, wherein the processing circuitry is configured to:

acquire information of the object;

calculate one or more positions and postures of the holder for picking up the object based on the acquired information;

generate a holding operation plan of holding the object by the holder, based on the acquired information;

control a motion of the holder such that the holder performs a pickup operation and a transport operation on the object, based on the holding operation plan;

detect a failure in a generation of the holding operation plan or a failure in a holding operation on the object by the holder;

perform a first retry determination of deciding an operation for a retry in a case in which the processing circuitry detects the failure in the generation of the holding operation plan, and perform a second retry determination of deciding an operation for a retry in a case in which the processing circuitry detects the failure in the pickup of the object by the holder, the second retry determination being different from the first retry determination;

determine whether or not there is a selectable one among the one or more positions and postures that have already been calculated, in a case in which it is determined that a retry is possible as a result of the first retry determination or the second retry determination; and in a case where there is a selectable position and posture that has already been calculated, determine that it is not necessary to acquire information of the object, and generate a new holding operation plan based on the position and posture that has already been calculated.

18. A control device for controlling a picking device for picking an object by a holder configured to hold the object, comprising:

processing circuitry configured to acquire information of the object;

calculate one or more positions and postures of the holder for picking up the object based on the acquired information;

generate a holding operation plan of holding the object by the holder, based on the acquired information;

control a motion of the holder such that the holder performs a pickup operation and a transport operation on the object, based on the holding operation plan;

perform a first retry determination of deciding an operation for a retry in a case in which a failure in a generation of the holding operation plan is detected, and perform a second retry determination of deciding an operation for a retry in a case in which a failure in a pickup operation on the object by the holder is detected, the second retry determination being different from the first retry determination;

determine whether or not there is a selectable one among the one or more positions and postures that have already been calculated, in a case in which it is determined that a retry is possible as a result of the first retry determination or the second retry determination; and in a case where it is determined that there is a selectable position and posture that has already been calculated, determine that it is not necessary to acquire information of the object and generate a new holding operation plan based on the position and posture that has already been calculated.

19. A non-transitory computer readable storage medium storing a program for controlling a picking device for picking an object by a holder configured to hold the object, wherein the program causes a processor of a computer to execute the steps of:

acquiring information of the object;

calculating one or more positions and postures of the holder for picking up the object based on the acquired information;

generating a holding operation plan of holding the object by the holder, based on the acquired information;

controlling a motion of the holder such that the holder performs a pickup operation and a transport operation on the object, based on the holding operation plan;

performing a first retry determination of deciding an operation for a retry in a case in which a failure in a generation of the holding operation plan is detected, and performing a second retry determination of deciding an operation for a retry in a case in which a failure in a pickup operation on the object by the holder is detected, the second retry determination being different from the first retry determination;

determining whether or not there is a selectable one among the one or more positions and postures that have already been calculated, in a case in which it is determined that a retry is possible as a result of the first retry determination or the second retry determination; and in a case where it is determined that there is a selectable position and posture that has already been calculated, determining that it is not necessary to acquire information of the object and generating a new holding operation plan based on the position and posture that has already been calculated.

20. A method for picking an object by a holder configured to hold the object, comprising steps, performed by a processor of a computer, of:

acquiring information of the object;

calculating one or more positions and postures of the holder for picking up the object based on the acquired information;

generating a holding operation plan of holding the object by the holder, based on the acquired information;

controlling motion of the holder such that the holder performs a pickup operation and a transport operation on the object, performed based on the holding operation plan;

performing a first retry determination of deciding an operation for a retry in a case in which a failure in a generation of the holding operation plan is detected, and performing a second retry determination of deciding an operation for a retry in a case in which a failure in a pickup operation on the object by the holder is detected, the second retry determination being different from the first retry determination;

determining whether or not there is a selectable one among the one or more positions and postures that have already been calculated, in a case in which it is determined that a retry is possible as a result of the first retry determination or the second retry determination; and in a case where it is determined that there is a selectable position and posture that has already been calculated, determining that it is not necessary to acquire information of the object and generating a new holding operation plan based on the position and posture that has already been calculated.

* * * * *